United States Patent
Golan et al.

(10) Patent No.: US 10,963,910 B2
(45) Date of Patent: Mar. 30, 2021

(54) REAL-TIME DETECTION OF INTENT-LESS ENGAGEMENTS IN DIGITAL CONTENT DISTRIBUTION SYSTEMS

(71) Applicant: Taboola.com Ltd, Ramat Gan (IL)

(72) Inventors: Lior Golan, Tel Aviv (IL); Eilat Lev-Ari, Tel-Aviv (IL); Hanan Lifshitz, Tel-Aviv (IL)

(73) Assignee: TABOOLA.COM LTD., Ramat Gan (IL)

( * ) Notice: Subject to any disclaimer, the term of this patent is extended or adjusted under 35 U.S.C. 154(b) by 116 days.

(21) Appl. No.: 16/181,560

(22) Filed: Nov. 6, 2018

(65) Prior Publication Data

US 2019/0139082 A1 May 9, 2019

Related U.S. Application Data

(60) Provisional application No. 62/581,958, filed on Nov. 6, 2017.

(51) Int. Cl.
*G06Q 30/00* (2012.01)
*G06Q 30/02* (2012.01)
*H04L 29/08* (2006.01)

(52) U.S. Cl.
CPC ..... *G06Q 30/0246* (2013.01); *G06Q 30/0241* (2013.01); *G06Q 30/0243* (2013.01); *G06Q 30/0248* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 7,657,626 B1* | 2/2010 | Zwicky | ............. | G06Q 30/0248 709/224 |
| 7,933,984 B1* | 4/2011 | Smith | ................ | G06Q 30/0248 709/224 |
| 8,554,635 B2* | 10/2013 | England | ............. | G06Q 30/0282 705/26.1 |

(Continued)

FOREIGN PATENT DOCUMENTS

WO   WO-2009137507 A2 * 11/2009   ............. G06Q 30/02

OTHER PUBLICATIONS

Kitts, Brendan. "Click Fraud Detection: Adversarial Pattern Recognition over 5 Years at Microsoft". Real World Data Mining Applications. Nov. 14 2014. (Year: 2014).*

(Continued)

*Primary Examiner* — Michael Bekerman
(74) *Attorney, Agent, or Firm* — Myers Wolin, LLC

(57) ABSTRACT

The presently disclosed subject matter includes a computer-implemented method and system of automatically generating quality scores in a content distribution system; the content distribution system enables the presentation of (digital) content on a display device of computer devices that enable users to engage with the presented content. The quality scores enable to detect and mitigate intent-less (e.g. fraudulent or low quality) user engagements with the user interface in the content distribution system. According to one example, the presently disclosed subject matter enables identification and mitigation of cyber theft in the form of engagement fraud in the content distribution system.

20 Claims, 6 Drawing Sheets

(56) References Cited

U.S. PATENT DOCUMENTS

| | | | | |
|---|---|---|---|---|
| 8,694,374 | B1* | 4/2014 | Diligenti | G06Q 30/02 |
| | | | | 705/14.47 |
| 8,880,541 | B2* | 11/2014 | Hill | G06F 16/958 |
| | | | | 707/758 |
| 9,734,508 | B2* | 8/2017 | Kouladjie | G06Q 30/02 |
| 9,882,886 | B1* | 1/2018 | Kowshik | G06Q 30/0246 |
| 10,769,658 | B2* | 9/2020 | Carlough | G06Q 30/0248 |
| 2007/0192190 | A1* | 8/2007 | Granville | G06Q 30/0277 |
| | | | | 705/14.69 |
| 2008/0010166 | A1* | 1/2008 | Yang | G06Q 30/0246 |
| | | | | 705/307 |
| 2008/0114624 | A1* | 5/2008 | Kitts | G06Q 30/0248 |
| | | | | 705/14.47 |
| 2008/0270154 | A1* | 10/2008 | Klots | G06Q 30/0241 |
| | | | | 705/14.4 |
| 2010/0036720 | A1* | 2/2010 | Jain | G06O 30/0232 |
| | | | | 705/14.13 |
| 2011/0161492 | A1* | 6/2011 | Granville | G06Q 30/0246 |
| | | | | 709/224 |
| 2015/0127470 | A1 | 5/2015 | Ghosh et al. | |
| 2015/0262222 | A1* | 9/2015 | Howe | G06Q 30/0248 |
| | | | | 705/14.45 |
| 2017/0091810 | A1* | 3/2017 | McGovern | G06Q 30/0247 |
| 2017/0195356 | A1* | 7/2017 | Turgeman | G06F 21/554 |

OTHER PUBLICATIONS

Kitts, Brendan. "Click fraud botnet detection by calculating mix adjusted traffic value: A method for de-cloaking click fraud attacks that is resistant to spoofing". 2013 IEEE International Conference on Intelligence and Security Informatics. Jun. 2013. (Year: 2013).*

Oentaryo, Richard. "Detecting click fraud in online advertising: a data mining approach". The Journal of Machine Learning Research . Jan. 2014. (Year: 2014).*

Hager, Martin. "Implementing best practices for fraud detection on an online advertising platform". Chalmers University of Technology / Department of Computer Science and Engineering. 2010. (Year: 2010).*

* cited by examiner

US 10,963,910 B2

REAL-TIME DETECTION OF INTENT-LESS ENGAGEMENTS IN DIGITAL CONTENT DISTRIBUTION SYSTEMS

This application claims priority from provisional application No. 62/581,958 filed Nov. 6, 2017, which is incorporated herein by reference in its entirety.

FIELD OF THE PRESENTLY DISCLOSED SUBJECT MATTER

The presently disclosed subject matter relates to the field of quality estimates in digital content distribution systems and to cyber fraud detection and/or mitigation in such systems.

BACKGROUND

Users interact (or engage) with online content that is provided (generally displayed on a display device) in various platforms, e.g. websites of content publishers, mobile apps, desktop browsers, TV screens, and other platforms for digital content. Some interactions (also referred to herein as "engagements") may be associated with specific measurable goals or objectives set by promoters. As a concrete example for illustrative purposes, a promoter may wish to increase awareness to an environmental cause by promoting content related to a specific environmental campaign. The promoter may have some control over the conditions in which the campaign's content is offered (or presented), which in turn directly or indirectly affects how users engage with it, and eventually support the campaign's cause, or otherwise achieve the campaign's eventual goals.

One example of control that a promoter may have over the conditions in which a campaign's content is provided is offering higher rewards to a content publisher (e.g. website owner) for specific engagements (engagements of a certain type, e.g. mouse clicks) of a user with the campaign's content, in the hope that such engagements will eventually lead to meaningful "conversions" in supporting the campaign's eventual cause.

In some cases, engagements may lack the intent to eventually convert to the promoter's eventual goals, thereby exposing promoters to manipulations, fraud and noise, as described herein. For example, a content publisher may be incentivized to generate fraudulent engagements, seemingly satisfying the promoter's demand for legitimate engagements, yet deliberately (or unintentionally) not converting to the campaign's goals. Specifically, if the promoter is given the impression that many users have engaged with the content, while in fact many of those engagements were intent-less (for example fraudulent engagements; e.g. made by bots, automated scripts, hired personnel for that task, or by other manners) then the eventual support in the promoter's cause will be lower than expected. Such intent-less engagements may be deliberate (e.g. engagement fraud) or unintentional, as explained further below, and in any case reduce the overall quality of the engagements, in the sense of their likelihood to convert to the campaign's goals.

In addition, intent-less engagements (either deliberate, unintentional or due to noisy factors, e.g. resulting from a poorly designed UI or UX) may degrade other aspects of the promoter's control over his campaign and its goals. For example, it may impede proper monitoring or controlling/bounding/estimating of the expected support in his cause over time. Such low quality, or intent-less, engagements may also decrease the trust of promoters in users or in content publishers, decrease the trust of users in the promoters, and in general decrease the overall efficiency of the overall ecosystem of online content distribution and damage the user experience in their interaction with digital content.

GENERAL DESCRIPTION

According to one aspect of the presently disclosed subject matter there is provided a computer-implemented method of calculating segment-specific estimated quality scores to enable an automatic detection of intent-less user engagements with a user interface of a plurality of computer devices operatively connected to a content distribution system and configured to display content items of a plurality of campaigns; the method comprising:

with the help of at least one processing circuitry that comprises one or more computer processors:

for each given campaign-segment pair of a plurality of campaign-segment pairs, determine a number of conversions and a number of engagements associated with the given campaign-segment pair;

for each campaign from a first plurality of campaigns, calculate a campaign-specific intermediary value;

for each given segment from a second plurality of segments, calculate an estimated quality score (EQS) for the given segment, based on one or more campaign-specific intermediary values.

According to another aspect of the presently disclosed subject matter there is provided a computer-implemented method of automatically detecting intent-less user engagements with a plurality of computer devices operatively connected to a content distribution system and configured to display content items of a plurality of campaigns; the method comprising:

with the help of at least one processing circuitry that comprises one or more computer processors:

for each given campaign of a first plurality of campaigns, obtaining data with respect to monitored engagements and conversions of the given campaign when presented in a first plurality of segments and calculating a campaign-specific estimated conversion score (ECS), the calculation comprising:

maintaining a first counter of observed conversions of the given campaign when presented in the first plurality of segments;

maintaining a second counter of observed engagements of the given campaign when presented in the first plurality of segments;

calculating the campaign-specific ECS based on the first counter and the second counter;

for at least one given segment of a second plurality of segments, calculating a segment-specific estimated quality score (EQS), the segment-specific EQS calculation comprising:

for each given campaign in a second plurality of campaigns:

determining a number of observed conversions in the given campaign when presented in the given segment;

determining a number of expected conversions in the given campaign when presented in the given segment;

calculating the segment-specific EQS, based on the observed conversions and the expected conversions of campaigns in second plurality of campaigns when presented in the given segment, and possibly on the campaign-specific estimated conversion scores associated with the second plurality of campaigns, the segment-specific EQS being indicative of intent-less engagements in the given segment.

Additional to the above features, the computer-implemented method according to this example of the presently disclosed subject matter can optionally comprise one or more of processes and/or features described below, mutatis mutandis, in any technically possible combination or permutation.

i. Wherein the number of expected conversions in the given campaign is determined based on the number of observed engagements in the given campaign when presented in the given segment and the campaign-specific ECS of the given campaign.

ii. The method further comprising executing an action directed for mitigating the engagement fraud, the action being for example, updating a reward given based on the observed engagements.

iii. Wherein the calculating of the campaign-specific ECS includes calculating a ratio between the first counter and the second counter.

iv. Wherein the segment-specific EQS calculation further comprises:

summing in a third counter the observed conversions determined in all campaigns of the second plurality of campaigns in the given segment;

summing the number of expected conversions determined in all campaigns of the second plurality of campaigns in the given segment to thereby obtain a segment-specific expected conversions value; and calculating the segment-specific EQS for the given segment, based on a ratio between the third counter and the segment-specific expected conversions value.

v. Wherein the segment-specific EQS calculation further comprises:

assigning a respective weight to each campaign of the second plurality of campaigns;

summing in a third counter a weighted value of the observed conversions determined in all campaigns of the second plurality of campaigns in the given segment, according to the respective weight;

summing a weighted value of the number of expected conversions determined in all campaigns of the second plurality of campaigns in the given segment according to the respective weight, to thereby obtain a segment-specific expected conversions value;

calculating the segment-specific EQS for the given segment, based on a ratio between the third counter and the segment-specific expected conversions value.

vi. wherein calculating the segment-specific EQS further comprises:

for each given campaign of the second plurality of campaigns, calculating a campaign-specific conversion quality score, based on the number of observed conversions and the number of expected conversions; and wherein calculation of the segment-specific EQS is based on a combination of campaign-specific conversion quality scores of the second plurality of campaigns.

vii. wherein calculating the segment-specific EQS further comprises: assigning a weight to each campaign-specific conversion quality score of the second plurality of campaigns; and calculating a weighted average value of the campaign-specific conversion quality scores.

viii. The method further comprises, performing at least one of (a) and (b):

a. determining a relationship between campaigns;
calculating a respective ECS of at least one campaign using data that includes observed conversions and observed engagements of at least one other related campaign; and b. determining a relationship between segments;
calculating a segment-specific EQS of at least one segment using data that includes observed conversions and expected conversions of at least one other related segment.

ix. The method further comprises:

for at least one specific campaign from the second plurality of campaigns, calculating an adaptive EQS indicating an EQS of the specific campaign when presented in the given segment; the calculation comprising:

summing in a fifth counter the observed engagements of the specific campaign when presented in the given segment;

summing in a sixth counter the observed conversions of the specific campaign when presented in the given segment;

calculating a pair-specific quality score based on a ratio between the fifth counter and the sixth counter;

calculating the adaptive EQS based on a combination of a weighted value of the segment-specific EQS and a weighted value of the pair-specific quality score.

x. Wherein calculating the adaptive EQS further comprises:

adapting the weights according to available data of: the observed engagements of the specific campaign and the observed conversions of the specific campaign.

xi. The method further comprises at least one of:
a. assigning a respective first weight to each engagement;
b. assigning a respective second weight to each conversion;
c. assigning a respective third weight to each campaign;
d. assigning a respective fourth weight to each segment; and
e. assigning a respective fifth weight to each expected conversion, wherein different weights may be associated in different stages of the calculation for adapting the calculation as necessary; for example, using a first set of weights for each observed conversion of a given campaign of a first plurality of campaigns when presented in the first plurality of segments (e.g. in the calculation process of the campaign-specific ECS), and another set of weights for each observed conversion in a given campaign of a second plurality of campaigns (e.g. in the calculation process of the segment-specific EQS); or in another example, using a set of weights for each segment in the calculation process of campaign-specific ECS;

and wherein the weights may depend for example on any of the following: rewards associated with campaigns; rewards associated with a conversion; estimated Pr(engagement|view); and the like.

xii. The method further comprises: in the event that one or more segment-specific EQS values comply with one or more predefined conditions, generating an alert.

xiii. The method further comprises: determining, based on the respective segment-specific EQS, whether a suspicion of engagement fraud has been identified in the at least one given segment.

xiv. The method further comprises generating an alert indicating the suspicion of an engagement fraud.

xv. The method further comprises executing an action (e.g. updating a reward given per user engagement) directed for mitigating the engagement fraud.

xvi. Wherein a reward is given per a user engagement with content of a campaign presented in the given segment, the method further comprising:
automatically updating (e.g. in real-time) the reward according to changes detected in the segment-specific EQS of the given segment.

xvii. The method further comprises transmitting to a promoter device alerts indicating the suspicion of an engagement fraud.

xviii. The method further comprises transmitting to a promoter device suggested actions (e.g. update of a reward given per user engagement) directed for mitigating an engagement fraud.

xix. The method further comprises assigning a respective weight to each number of expected conversions in the given campaign when presented in the given segment.

xx. Wherein the segment is any one of: a website; a time frame; a group of users having one or more common characteristics.

xxi. The method further comprises: smoothing the segment-specific EQS, e.g. smoothed segment-specific EQS=max(A+the segment-specific EQS/B, C), thereby ensuring that the smoothed estimated quality score the segment-specific EQS is within certain specified bounds.

xxii. Wherein the first plurality of campaigns and second plurality of campaigns are possibly, but not necessarily, the same campaigns.

xxiii. Further calculating a comparative/relative level of intent-less engagements between at least two segments (or segment attributes), based on the calculated segment-specific EQS values as intermediary values; thereby allowing to compare between two segments even if each of these segments was presenting a distinct set of campaigns (i.e. even when there was no single campaign for which data was collected with respect to both segments).

According to another aspect of the presently disclosed subject matter there is provided a computerized device operatively capable of automatically detecting intent-less user engagements with a plurality of computer devices operatively connected to a content distribution system and configured to display content items of a plurality of campaigns; the computerized device comprising at least one processing circuitry that comprises one or more computer processors configured and operable to:

for each given campaign of a first plurality of campaigns, obtain information pertaining to engagements and conversions of the given campaign when presented in a first plurality of segments and calculate a campaign-specific estimated conversion score (ECS), the calculation comprising:
maintaining a first counter of observed conversions of the given campaign when presented in the first plurality of segments;
maintaining a second counter of observed engagements of the given campaign when presented in the first plurality of segments;
calculating the campaign-specific ECS based on the first counter and the second counter;
for at least one given segment of a second plurality of segments, calculate a segment-specific estimated quality score (EQS), the segment-specific EQS calculation comprising:
for each given campaign in a second plurality of campaigns:
determining a number of observed conversions in the given campaign when presented in the given segment;
determining a number of expected conversions in the given campaign when presented in the given segment;
calculate the segment-specific EQS, based on the observed conversions and the expected conversions of campaigns in the second plurality of campaigns when presented in the given segment, and the campaign-specific estimated conversion scores associated with the second plurality of campaigns, the segment-specific EQS being indicative of intent-less engagements in the given segment.

According to another aspect of the presently disclosed subject matter there is provided a non-transitory computer readable storage medium tangibly embodying a program of instructions that, when executed by a computer, cause the computer to perform a method of automatically detecting intent-less user engagements a plurality of computer devices operatively connected to a content distribution system, the computer devices being configured to display content items of a plurality of campaigns; the method comprising:

with the help of one or more computer processors:
for each given campaign of a first plurality of campaigns, obtaining information pertaining to engagements and conversions of the given campaign when presented in a first plurality of segments and calculating a campaign-specific estimated conversion score (ECS), the calculation comprising:
maintaining a first counter of observed conversions of the given campaign when presented in the first plurality of segments;
maintaining a second counter of observed engagements of the given campaign when presented in the first plurality of segments;
calculating the campaign-specific ECS based on the first counter and the second counter;
for at least one given segment of a second plurality of segments, calculating a segment-specific estimated quality score (EQS), the segment-specific EQS calculation comprising:
for each given campaign in a second plurality of campaigns:
determining a number of observed conversions in the given campaign when presented in the given segment;
determining a number of expected conversions in the given campaign when presented in the given segment;
calculating the segment-specific EQS, based on the observed conversions and the expected conversions of campaigns in second plurality of campaigns when presented in the given segment, and the campaign-specific estimated conversion scores associated with the second plurality of campaigns, the segment-specific EQS being indicative of intent-less engagements in the given segment.

According to another aspect of the presently disclosed subject matter there is provided a computer-implemented method of automatically mitigating fraudulent engagements with a user interface of a plurality of computer devices operatively connected to a content distribution system, the computer devices configured to display content items of a plurality of campaigns; the method comprising:

with the help of one or more computer processors:

for each given campaign of a first plurality of campaigns, monitoring engagements and conversions of the given campaign when presented in a first plurality of segments and calculating a campaign-specific estimated conversion score (ECS), the calculation comprising:

maintaining a first counter of observed conversions of the given campaign when presented in the first plurality of segments;

maintaining a second counter of observed engagements of the given campaign when presented in the first plurality of segments;

calculating the campaign-specific ECS based on the first counter and the second counter;

for at least one given segment of a second plurality of segments, calculating a segment-specific estimated quality score (EQS), the segment-specific EQS calculation comprising:

for each given campaign in a second plurality of campaigns:

determining a number of observed conversions in the given campaign when presented in the given segment;

determining a number of expected conversions in the given campaign when presented in the given segment;

calculating the segment-specific EQS, based on the observed conversions and the expected conversions of campaigns in the second plurality of campaigns when presented in the given segment, and the campaign-specific estimated conversion scores associated with the second plurality of campaigns, the segment-specific EQS being indicative of fraudulent engagements in the given segment.

The computerized device, the non-transitory computer readable storage medium, and the computer implemented method disclosed herein according to various aspects, can optionally further comprise one or more of features (i) to (xxiii) listed above, mutatis mutandis, in any technically possible combination or permutation.

The presently disclosed subject matter further contemplates a client computer device configured and operable to generate a warning indicative of intent-less engagements generated occurring in computerized devices operatively connected to a content distribution system, the computer devices configured to display content items of a plurality of campaigns;

the client computer device is configured to receive data indicative of or deduced from one or more segment-specific estimated quality score (EQS) values;

wherein the one or more segment-specific estimated quality score (EQS) values are generated as disclosed herein above with respect to the various aspects of the presentably disclosed subject matter and further detailed below.

According to one example, the client computer device is configured and operable to execute applications configured to display information related to intent-less engagements detected in one or more segments, e.g. in the form of a message. According to some examples, the application enables a user (e.g. promotor) of the client device to update a reward given per engagements to thereby mitigate possible engagement fraud or otherwise low-quality engagements.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DESCRIPTION

Figure 1:
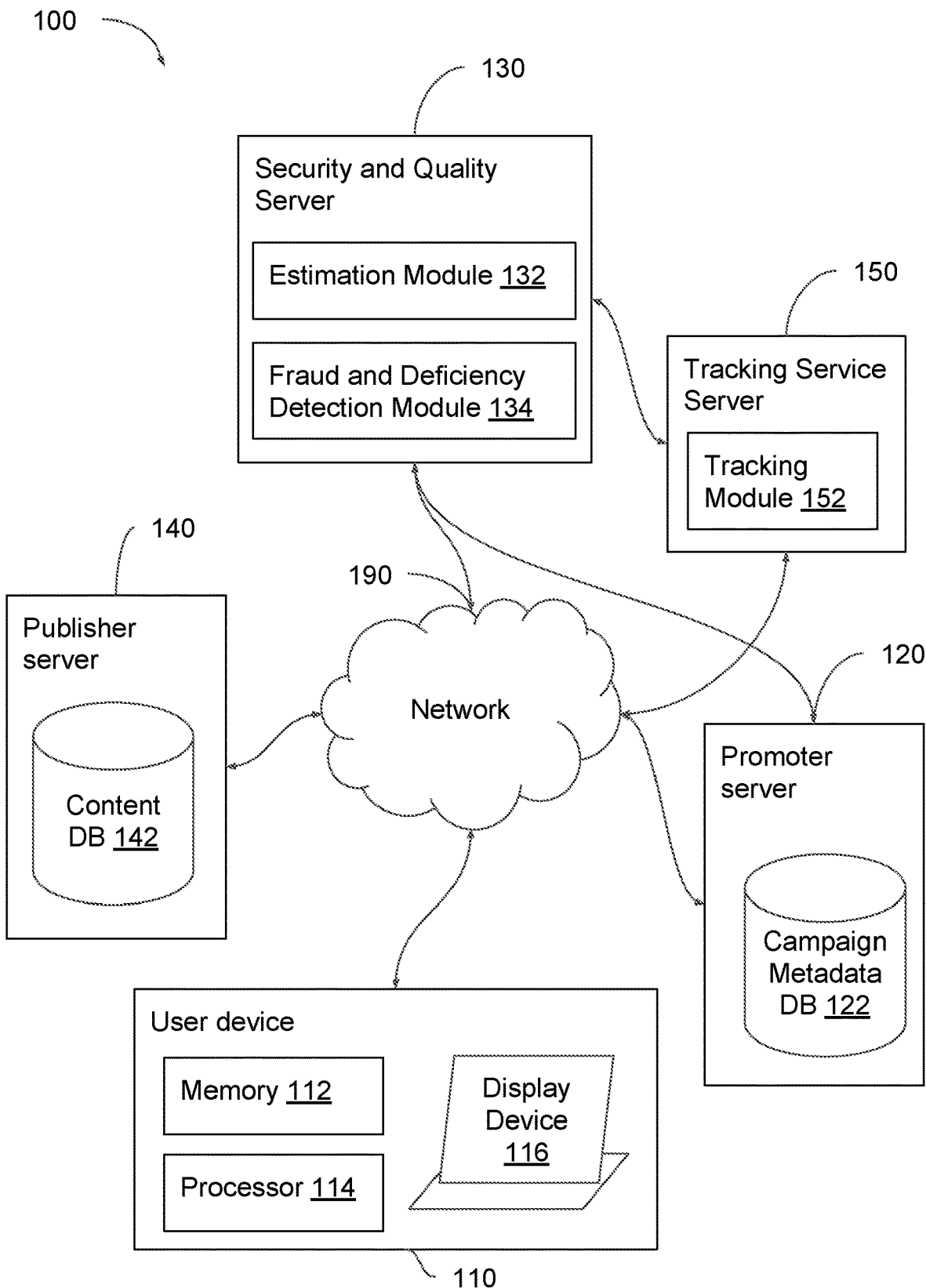
FIG. 1 is a schematic block diagram of a content distribution system according to some examples of the presently disclosed subject matter.

Users interact with various types of online content (e.g. over Internet traffic). The content is provided in various types of platforms, content publishers or segments as described herein below, and under different conditions.

Some of the content is associated with different types of campaigns. A campaign may be associated with one or more content items, that are monitored, controlled or promoted by a promoter (e.g. advertiser) of that campaign. Content items associated with a campaign usually relate to a certain theme or goal. For example, a certain promoter of an environmental cause may promote a campaign around that environmental cause, advertising certain campaign content in various websites that, when clicked by users, may eventually lead them to a dedicated webpage inviting the users to sign up for the cause. One goal of the promoter in that campaign would be to increase the number of users signing up for his cause (e.g. signing a petition and/or donating money).

From the point of view of a single campaign promoter, a specific user can be seen as following a "funnel" or series of steps related to the campaign, that may eventually lead to measurable goals being met with respect to that user. Reverting to the illustrative example above of a promoter of a certain environmental cause, an example of a series of steps may include:

1) user visits a content publisher (e.g. web site, or a search engine results webpage) or utilizes some other platform and conditions to consume digital content;

2) user is exposed to one or more content items (e.g. banner, video, link, image, article, etc.) related to a campaign (e.g. page view);

3) user interacts with campaign's content (e.g. the content becomes visible to the user, or the user hovers with a mouse over the content);

4) user interacts (or engages) with campaign's content in a more explicit manner: performs engagement (e.g. clicks or does not click) on the content to read more about the cause or be directed to another webpage;

5) user performs a desired action (a "conversion" occurs), e.g. user eventually supports the environmental cause (e.g. subscribes to newsletter, donates to cause, signs a petition, purchases an item related to the campaign, etc.) or otherwise satisfies certain specified conditions for a conversion to occur with an associated value, as described herein below.

A promoter may have more control on certain steps in the user's funnel, e.g. reward a content publisher upon specific events or engagements of a user with the campaign's content at step 3 or 4 in the example above, yet eventually may care more for other steps "downstream" or later in the user funnel, e.g. that the user will eventually support a campaign's goal or cause in step 5 (conversion step) of the example above.

There is an inherent technological gap between such rewardable engagements and the more desired conversions occurring later. For example, in many cases it is technologically more simple to track engagements of users within a website than to track the desired conversions that follow these engagements. This is so since in general tracking such conversions and associating them with the correct engagements that lead to them is a greater technological challenge than simply recording engagements (e.g. mouse clicks), and also because conversions often occur at websites other than the publisher's website (e.g. are redirected, from the publisher's website, in response to clicking on a web link).

This technological gap may increase the number of engagements with lower intent to becoming conversions, herein also referred to as intent-less engagements, e.g. by increasing the incentive for fraud and manipulation of engagements, or by otherwise leading to reduced quality of engagements. For example, a publisher site providing content related to a promoter's campaign, being rewarded by the promoter based on rewardable engagements (e.g. mouse clicks) may be incentivized to encourage or implement fraudulent engagements (e.g. fraudulent clicks) to increase his own reward, resulting in the promoter receiving a skewed perception of reality. For instance, the promoter may observe a large number of perceived user engagements (and possibly expect a larger number of conversions resulting from them), while in reality a considerable portion of those engagements may be "false" or intent-less engagements (e.g. fraudulent, deliberately manipulated, misintended or unintentionally noisy, or of low quality) thereby leading to a lower than expected rate of conversion of engagements to the campaign's eventual goals.

The technological gap between rewardable engagements and conversions to campaign's goals increases susceptibility to cybersecurity risks such as cyber theft and fraudulent behavior such as generating fraudulent engagements (e.g. for the purpose of illicitly increasing the reward given to the publisher).

In addition, the technological gap between rewardable engagements and conversions to a campaign's goals, that are more desired by the promoter, also decrease the overall efficiency of the ecosystem. It may hinder user experience, as well as the promoter's experience, and generally damage the trust between the different players/actors in the ecosystem including: users, content providers and campaign promoters. For example, apart from encouraging deliberate manipulations to damage the user experience and generate fraudulent engagements, a publisher may be less incentivized to ensure a better user experience for his users.

Concretely, in the specific example of an advertiser promoting specific campaign goals at some publisher sites, while e.g. rewarding a publisher for mouse clicks on the campaign's content, as explained above, the publisher may be incentivized to encourage fraudulent clicks. Additionally, the publisher may provide a user experience (UX) or user interface (UI) that generates (either intentionally or unintentionally) more engagements than engagements that would otherwise occur in normal/proper UX or UI conditions. This may occur when the design of a user interface or user experience misleads the user into unintentionally interacting with content generating a reward for the publisher. In one example, if mouse clicks are considered as rewardable engagements, a website changing its page layout during slow loading of the content may lead to such a bad UX, so that when a user clicks on a certain location on the page, some other content may be loaded in the moment of that click (either intentionally or unintentionally) and be clicked instead of the content the user intended to click on; that user, having clicked with no intent to eventually convert to the campaign's goals, is likely to immediately "bounce" back from the content that was offered in response to the intent-less (or low quality) click.

More examples of "false" or intent-less engagements that come in the form of poor quality user experience or user interface are discussed below. In general, rewardable engagements, that may be the cause of a poorly designed user interfaces or unsatisfying user experience, are maintained, as the resulting additional reward received for the additional engagements reduces the incentive of the players in the ecosystem (the entities involved in maintaining the user interface, e.g. website owner) to fix such deficiencies. Accordingly, sometimes the act of maintaining such UI or UX, when done so in order to increase rewards from user engagements, is considered essentially a type of fraud or direct attempts of cyber theft.

In the following description elements in the drawings are not necessarily drawn to scale. The terms "computer system", "computerized device", "computer device", "computer server device", "computer sub-system" or the like should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and is capable of executing computer instructions (e.g. loaded on a computer memory being operatively connected to the processor).

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 2, 2a, 2b, 2c and 3 may be executed. Also the order of execution of the described operations may be different than the order which is presented in the figures.

FIG. 1 illustrates general schematic diagrams of the system in accordance with some examples of the presently disclosed subject matter. The components in FIG. 1 may be centralized in one location or dispersed over more than one location. In other embodiments of the presently disclosed subject matter, the system may comprise fewer, more, and/or different modules than those shown in FIG. 1. For example, Security and Quality server 130 can be implemented on a single server computer device or otherwise be distributed over a number of server computer devices.

The term "user" as used herein should be broadly construed to include a human user interacting via a digital user device (e.g. on-screen graphical user interface running on a computer device), with digital content as well as a non-human user such as bots, scripts, or semi-automatic systems, etc.

The term "promoter" as used herein should be broadly construed to include an entity interested in monitoring, measuring and controlling measurable metrics related to specific goals, via digital campaigns and associated content. A campaign may be associated with one or more content items, that are monitored, controlled or promoted by a promoter (e.g. advertiser) of that campaign. Examples of metrics may include: rewardable engagements, conversions of user engagements to campaign's goals, other interactions and lack of interactions of users with content related to a campaign, and other metrics related to the campaign management, e.g. desired limits to impose on some of the metrics. A promoter may wish to manage various metrics related to campaigns including for example any one or more of the following: estimate, measure, predict and control (optimize/increase/decrease/affect the distribution of) the various metrics related to his campaigns. These may include for example, point estimates, distributions, bounds, or confidence intervals. For example, the promoter may estimate, measure, predict, or control the probability of a conversion, given a rewardable event under some assumptions; or the rate or distribution of conversions (or other metrics) over time; or the observed number and reward value of rewardable engagements in a specific context, or their quality when applicable; or the observed number conversions and their size or quality when applicable; etc.

In one example, a promoter may be an advertiser that promotes goals of digital campaigns using digital content that is provided to users by various content publishers on the Internet. The advertiser may reward publishers for rewardable engagements with content related to his campaigns, e.g. rewarding the publisher when a user clicks on such content. The reward may be agreed upon in advance between the advertiser and the publisher, and controlled by the advertiser as part of his control over the measurable metrics. E.g. in the case of mouse clicks being the rewardable engagements, the reward is often referred to as cost per click, or CPC in short. However, the advertiser is more interested in the conversions related to the campaign, that occur later or "downstream" in the user funnel.

As explained above for the general goals of a promoter, the advertiser may wish to estimate, measure, predict, control various metrics, e.g. the probability of a conversion given a rewardable engagement, under certain campaign constraints or segments (time, budget, distribution channels etc.).

Campaigns may be associated with campaign attributes, e.g. capturing some technological or contextual aspects of the type of the campaign, or its associated engagements or conversions (described herein in this specification). For example, the type of digital content used in the campaign may be such attributes; the contextual topic of the campaign (e.g. sport, fashion, news, etc.); the target age group or socioeconomic status; whether a campaign includes a textual digital content or not, etc. Other campaign attributes may include the type of the desired conversion, e.g. whether the campaign is associated with a binary conversion (e.g. subscribed to a newsletter or not; donated to a cause or not; filled in a form or not, etc.) or a numerical one.

Campaign attributes may be used to define a relationship or association between campaigns. Campaigns may be associated to attributes either by "hard" association (i.e. sharing one or more common attributes, or not, e.g. as in the case of a tree hierarchy between campaigns) or a "soft" association (i.e. similarity between attributes of different campaigns, e.g. having an attribute with a certain specified associated weight). For example, a relation of similarity between campaigns can be determined based on the number of identical (or sufficiently similar) attributes out of a group of attributes.

The term "segment" as used herein should be broadly construed to include a portion of the digital traffic in consideration. Campaigns may be distributed over different segments, possibly overlapping. An example of non-overlapping segments may be distinct publisher sites (i.e. each segment is a different publisher website), or distinct demographics of the users related to that usage traffic (i.e. each segment is a different portion of the traffic depending on the characteristic of the user that interacts or engages with the digital content, though regardless of the website at which it occurs). An example of overlapping segments may include a contextual category of the digital content (e.g. a content item may be associated to both "news" and "sports").

Further examples of segments may include: publisher websites, time frame or time period (e.g. classifying the digital traffic according to the specific hour of day, day of week, etc.) in which an engagement or conversion occurred (described herein), demographic characteristics (e.g. geographic location), behavioral characteristics or patterns of a user (e.g. as estimated by a learning algorithm or classifier, using methods known in the art), etc. or combinations of these aspects.

Segments may be associated with segment attributes, e.g. characterizing some technological or contextual aspects of the type of the segment, or its associated engagements or conversions. For example, the type of digital content provided in the segment may be such attributes, e.g. whether a segment primarily delivers a textual digital content or video or other digital content. Other segment attributes may include attributes related to characteristics of the portions of the digital traffic in consideration (e.g. characteristics of the users associated with that segment's traffic). Additional segment attributes may include attributes characterizing the theme of the segments, e.g. websites related to sports, news, photography, etc. Other segment attributes may include attributes characterizing the targeted or associated age group, demographics, behavioral patterns or targeted or associated socioeconomic status.

Segment attributes may be used to define a relationship or association between segments, e.g. a hierarchy structure or other similarity. Segments may be associated to attributes either by "hard" association (i.e. having the attribute or not) or a "soft" association (i.e. having the attribute with a certain specified associated weight). For example, a relation of similarity between segments can be determined based on the number of identical (or sufficiently similar) attributes out of a group of attributes.

The term "rewardable event", "rewardable engagement" or simply "engagement" as used herein should be broadly construed to include a measurable action, or lack of action, of a user in interaction with content related to a promoter's campaign. A promoter can reward other entities for such engagements, e.g. reward a content publisher (e.g. website owner) at which the rewardable engagement took place, and may control/adapt the reward amounts per specific conditions. For example, engagements related to the same campaign but occurring in different "segments" of the digital traffic may have different rewards. Examples of rewardable events may include: page views, mouse hovering, or clicks (applied by any means including: mouse, touchpad, touch screen, etc.) on content related to a campaign; installations of mobile or desktop apps (applications), subscription to a newsletter, filling out details on a digital form, purchasing an item related to the campaign, etc.

The term "conversion" as used herein should be broadly construed to include a measurable action, or lack of action, of a user in interaction with a campaign's goals or objectives. A conversion usually occurs "downstream" or "later" in the funnel of user's interactions with digital content after an engagement has occurred in the sense that was defined above. Also, as explained above, a promoter may be interested in measuring various metrics related to conversions, e.g. better estimating/predicting the rate of conversions, or the probability of a conversion, given that an engagement took place, possibly in a given segment or conditions. For example, a promoter may be interested in estimating the quality of rewardable engagements in the sense of their likelihood to eventually lead to conversions.

A conversion may be binary (either occurred or not), nominal, or numerical, and possibly depend on time. For example, a conversion occurring 30 days after an engagement has occurred may be "less important" or of "lower quality" than a conversion occurring 30 seconds after an engagement, regardless of the intrinsic value of those conversions to the promoter. A conversion may be derived from a single user event or interaction (or lack of such), or from an aggregated calculation on a plurality of such events. One example of a simple aggregated calculation is the number of articles read about the campaign after an engagement has occurred. Notably, herein when we discuss a counter of conversions (or other means of aggregating data related to conversions), such counter may refer to the number of conversions (e.g. in the case of binary conversions), or to the sum of the associated values with those conversions (e.g. in the case of numerical conversions).

Another example of an aggregated calculation may be an application of a statistical learning algorithm to predict/estimate some metric related to the user, e.g. trust, loyalty, or brand-awareness. One example of measuring trust may consider the number of positive interactions of the user with certain content, over a certain period of time; a learning model may be trained, utilizing historical data on users together with their perceived (or directly surveyed) measured level of trust, thereby allowing automatic predictions/estimations of that trust measure on a larger set of users.

As illustrated above, in the example of mouse clicks as rewardable engagements, a conversion may be a subscription to a newsletter or purchasing an item related to the campaign etc.; alternatively, in the example of page views as rewardable engagements, a conversion may be user engagements or interaction (or lack of such) occurring after a page view has occurred, e.g. mouse hover, click, measured duration of page view, subscription, purchasing, etc. or other aggregated metrics related to the user, based on a plurality of user events (or lack of such), as demonstrated above. Note that the same type of action (or lack of action) may be considered a "rewardable engagement" in one campaign, a "conversion" in another campaign, or ignored in other campaigns.

The term "intent-less" or "low quality" engagements as used herein should be broadly construed to include (rewardable) user engagements or interactions that have a relatively lower level of intent by the respective users, so that the likelihood of those engagements to lead to conversions is lower than other engagements (or in the case of non-binary conversions, may lead to conversions of lower associated value). This includes "fraudulent", "malicious" or "misintended" engagements deliberately intended to manipulate the corresponding measurable metrics (also known as "cyber theft" or "engagement fraud"), e.g. engagements which lead to the skewed impression of reality that there were more legitimate rewardable engagements than what is actually true, as some of the engagements were fraudulent and non-legitimate. Intent-less or low quality engagements also include "unintentional" or "deficient" engagements which stem from misleading UI or UX, that, as explained above, may not convert well to conversions due to a lower level of intent by the users responsible for such intent-less engagements (e.g. a user with low intent or interest in the campaign performs an unintentional click due to a misleading UI, and then "bounces" back from the content that was offered, in response to the intent-less click).

Examples of entities that may encourage or implement engagement fraud include any players/actors in the ecosystem that may benefit from such fraud: by directly benefiting from rewards given for fraudulent engagements (e.g. rewarded per mouse click), by saving them efforts that are required to prevent that fraud from happening, or by obstructing the goals of a specific competitor promoter's campaign/cause.

One example of a player or actor with direct benefit from intent-less engagements (e.g. fraudulent) is a content publisher (e.g. a website owner) who is rewarded by a promoter for engagements of users on content associated with the promoter's campaign. Such a publisher may be incentivized to deliberately generate fraudulent engagements (e.g. mouse clicks) to increase his reward, usually at the expense of the promoter (e.g. the promoter will have to pay for the fraudulent clicks, while observing a skewed view of reality).

One example of a player or actor with indirect benefit from intent-less, unintentional or deficient engagements is a content publisher with lower quality of engagements stemming from bad user experience (UX) or a poor user interface (UI). Although the publisher may have not deliberately caused the conditions that generate those deficient engagements, by not fixing or improving the UX or UI deficiencies for his users, the publisher benefits from these saved efforts (e.g. saving funds which would be otherwise invested in amending the deficiencies), possibly in addition to the further direct benefit from rewardable engagements stemming from the flawed UX or UI.

A third-party service or system may be used to facilitate engagement fraud. The incentive for such fraud in the ecosystem leads in some cases to the existence of easily accessible services providing such fraud services, depending on the exact definitions of rewardable engagements and conversions, e.g. click fraud, page views fraud, subscriptions fraud, app installations, dummy/fake/fraudulent usage (e.g. in case merely installing the app is not enough to be considered as a rewardable engagement, but it is also required that the user that installed the app also demonstrated some usage of it), and so on.

The term "quality" as used herein should be broadly construed to include a comparative measure of engagements vs. conversions in a certain context. Some engagements may have higher probability to eventually lead to a conversion, and may be therefore regarded as having higher quality from the point of view of a promoter. Fraud, for example, may lead to overall lower quality of engagements in that sense, as fraudulent engagements do not lead to conversions (or lead to conversions of lower value to the promoter).

As a concrete example, for illustrative purposes, consider a promoter that associated higher "quality" for engagements that are more likely to bring about respective conversions. Such a promoter may be interested in estimating a quality score of the engagements, e.g. estimating the probability of a conversion to occur, given that a rewardable engagement has occurred on his campaigns. In one example, a specific campaign C1 is to be engaged by users in different conditions, e.g. provided in or by different content publishers (e.g. different websites, or more generally in different "segments" as described herein). The quality (also referred to herein below as "estimated quality score" or EQS in short) of the engagements of the campaign C1 in one segment S1 (e.g. a first website), denoted by Quality(C1,S1), may differ from the quality Quality(C1,S2) of engagements on that same campaign C1, but in another segment S2 (e.g. a second website). For example, if S1 is more susceptible than S2 to fraudulent or otherwise intent-less engagements, while in all other aspects S1 and S2 are essentially similar, then Quality(C1,S1) is expected to be lower than Quality(C1,S2).

Quality estimates can include for example, point estimates, confidence intervals, bounds and error estimates. In addition, estimates can include, for example, significance metrics or metrics related to the effect size. In some examples, point estimates are more useful and more intuitive for a promoter, but in some examples error estimates are required, e.g. if a promoter is interested in decreasing the variance of expected rewards.

The term "performance" or "performant" as known in the art should be broadly construed to include the efficient usage of computer resources (including CPU, memory, disk resources etc.), as well as time resources (including for example, processing time and data transmission time).

The term "scalable" or "scalability" as known in the art, should be broadly construed to include the capability to handle a growing amount of work (e.g. an increasing number of segments and/or campaigns), or the potential to accommodate that growth.

As explained above, there is a technological gap between rewardable engagements and conversions that occur consequently, in the user funnel. One implication is that a content publisher/provider that gets rewarded for engagements has an increased incentive for facilitating intent-less or low quality engagements, either deliberately (e.g. by generating fraudulent engagements) or unintentionally, actively or passively (e.g. by not fixing lower quality of such engagements due to UI/UX deficiencies).

A promoter who is willing to invest a total reward of CONVGOAL (i.e. "conversion goal" e.g. some currency value) for each expected conversion, and estimates the probability of an engagement leading to a single conversion by a conversion rate (CVR) representing a probability of conversion per engagement (Pr(conversion|engagement)), may be willing to reward each such engagement with a reward of REWARD=CONVGOAL*CVR.

As also explained above, not all engagements are expected to be of the same quality. As a first approximation, one can distinguish between engagements according to the segments in which they take place. In the case of clicks as rewardable engagements and publisher sites (websites) as segments, then clicks taking place in a publisher site S1 that encourage click fraud in his site, might be fraudulent, not lead to conversions, and therefore be of lower quality to the promoter as compared to clicks occurring on an honest publisher site S2. To protect from such theft (in the form of click fraud in this example), the promoter could set his reward REWARD(S1) to engagements occurring in S1 to be lower than the reward REWARD(S2) to those in S2, or even set REWARD(S1):=0, essentially choosing not to work with S1 while fraud is prevalent there.

One approach of protecting against theft in the form of fraudulent engagements as described above or deficiencies in the form of "deficient", "misintended" or otherwise lower quality engagements (e.g. stemming from UI/UX deficiencies), is to estimate low quality (e.g. fraud) rates in order to adapt (decrease) rewards given for some of those engagements. In this way, not only is a promoter protecting himself from such cyber theft, but the technological gap in the ecosystem, as explained above, is mitigated, leading to a more efficient ecosystem for all honest players/actors: e.g. fraud in its different embodiments is dis-incentivized, deficiencies in user interfaces or user experience have a higher incentive to be fixed (or quality enhancement is carried out), and trust between the players in the ecosystem increases, e.g. between promoters and publisher sites, promoters between the engaging users, or between users and publisher sites, due to better user experience/a better user interface.

According to one common approach a promoter would collect data on engagements and conversions associated with his campaigns. In order to be able to distinguish between engagements of varying quality, the promoter would collect data separately for each one of his campaigns, and corresponding segments in which they were provided and generate individual estimations for each campaign in each segment it is provided.

Assuming the number of different campaigns are denoted by |C| and for simplicity of calculations assume they are all provided in the same number of segments |S|, then according to the common approach, |C|*|S| binary decisions need to be made. Namely, decide for each campaign and each segment in which it is provided, whether that campaign should be working with that segment or not (as it may be engaged with fraudulent activity, or otherwise involve a too large number of lower quality or intent-less engagements).

One technological challenge in such approaches is in assuming that the campaign data is maintained by the promoter per segment. To this end, a computer system utilized by a promoter to maintain data on the relation between campaigns and segments needs to distinguish between which engagement and conversion occurred, and in which segment. In some conditions, this may be obtained using some tracking technologies like a "tracking pixel" or "conversion pixel" to keep track of the conditions in which an engagement or conversion took place, in particular the user and segment in which they occurred. Regardless of the actual implementation (e.g. whether this was in fact done by adding a 1×1 pixel to the campaign's content, or using some other technology that distinguishes the segment information, or by the promoter integrating with a third-party tracking service to enable distinguishing between segments), this may require a technological effort from the promoter of the campaign. In addition, in some cases this may not be possible, as some tracking technologies may not be applicable for all campaigns in all segments, e.g. due to difference between the technologies in use (for example, HTML vs. Flash, different types of browser configurations, various blocking technologies, static content vs. dynamic etc.).

Another challenge in such approaches is the scarcity of information for proper individual estimations to be made, especially for segments with little usage data. For example, in case of segments being content sites (web sites), there may be a large number of sites with little usage data, a.k.a. a "long tail" of small sites, with relatively little audience reach, page views, number of users, or other usage metrics.

In particular, for any such "long tail" segment Sj that is scarce with usage data, an individual promoter will not have enough engagements and conversions data on a campaign in Sj to derive meaningful or statistically significant estimates on the quality of Sj to the promoter's campaign.

In addition, for certain time-constrained campaigns, such estimation approaches may be inapplicable from an information-theoretic perspective, namely there will never be enough data for this promoter's campaign to reach such statistically significant estimates, given the campaign's time constraints on that specific segment Sj.

Another technological challenge in such approaches, that is relevant to all types of segments (and not only to "long tail" ones with little usage data), involves further specifics related to the campaign in discussion. If, for example, a campaign Ci is provided in some content site Sj, other campaigns may be favored over Ci due to many reasons, e.g. the result of rewards optimization processes from the point of view of an owner (e.g. publisher) of site Sj (e.g. publisher rewards are sometimes referred to as Reward per Mille or Revenue per Mille (RPM) in some contexts), or to satisfy other budget/inventory/policy requirements. This will lead to having to wait a considerable amount of time until enough data is finally gathered on engagements and conversions of Ci in Sj, for the promoter of Ci to be able to generate meaningful estimations and make decisions. During that time, the promoter may be susceptible to cyber theft or engagement fraud in Sj. Note that this implies that for certain time-constrained campaigns, such approaches may be completely inapplicable from an information-theoretic perspective, i.e. there will never be enough data for meaningful estimates and protection from possible fraud.

In addition, if a considerable amount of time is required in order to reach meaningful estimates, then there is also an inherent inability to adapt to real-time trends. In particular, if a segment Sj begins engaging with fraudulent activity at some point in time, all campaigns served in that segment during that time will suffer from theft or loss of rewards on account of fraudulent engagements, until sufficient data is collected over time, allowing to adapt their estimates and update their decisions in respect to Sj.

The above may present even further challenges in the case of new campaigns, with a "cold start" problem, where there no data has yet been collected on engagements and conversions for such campaigns (as they are new).

The challenges described above may sometimes encourage promoters to categorically decide whether or not to work with a segment, which may have negative implications on the ecosystem in general, and to the individual honest players in it in particular. For example, in the case of segments being each a different content website, as a statistically significant decision reassuring that a site is not fraudulent requires enough data to be collected, such harsh binary approaches are already biased to giving precedence to larger sites, which enjoy larger traffic volumes. That is, smaller sites are "discriminated" against, regardless of their quality, or whether or not they are engaged in fraud. This may lead to decreasing trust between player (or actors) in the ecosystem, and a generally "unfair" distribution of information, which may, in turn, lead to further inefficiency issues in the ecosystem.

Moreover, instead of working with all segments (e.g. even with "long tail" websites), promoters may be encouraged to focus their work on a smaller selection of "premium" sites, which may have gained their high reputation due to other metrics (e.g. being associated with some prestigious newspaper brand), that are not necessarily related to the concepts of fraud rate or lower quality engagements, and therefore such "premium" sites may still suffer from some fraud (e.g. engagements of lower quality occurring due to bad user experience, where the site's owner has little incentive to improve the user experience, at least from the point of view of the rewardable engagements stemming from those user experience issues).

Another challenge in approaches for individual estimations for each campaign and segment is related to the requirement to be performant and scalable, either in inherent complexity of the required operations, or in the required resources for those operations, e.g. memory and CPU requirements. If we denote by |C| the number of different campaigns and by |S| the number of segments, then approaches as described above will require maintaining an order of magnitude of O(|C|*|S|) counters (as well as perform an order of magnitude of O(|C|*|S|) operations.

The presently disclosed subject matter includes a computer-implemented method of automatically generating estimated quality scores in a content distribution system; the content distribution system enables the presentation of (digital) content on a display device of computer devices that enable users to engage with the presented content. The estimated quality scores enable to mitigate intent-less or deficient user engagements with the user interface in the content distribution system.

According to one example of the presently disclosed subject matter, the computer-implemented method enables identification and/or mitigation of engagement fraud in the content distribution system.

The presently disclosed subject matter further contemplates a computer system configured and operable for executing the computer implemented method.

FIG. 1 is a block diagram schematically illustrating a content distribution computer system 100 that includes a Security and Quality server 130, according to some examples of the presently disclosed subject matter. FIGS. 2, 2a, 2b, 2c and 3 are flowcharts illustrating some operations performed according to some examples of the presently disclosed subject matter. Some operations are described below with reference to a specific component in system 100. It is noted that such description is made by way of example for illustrative purposes only, and any reference made to elements in FIG. 1 should not be construed to limit the disclosed subject matter to the specific structure of system 100.

System 100 is a distributed computer system comprising a plurality of computer sub-systems (or devices) communicating over one or more communication networks, for example over the Internet infrastructure. While components in system 100 are illustrated as a dedicated computer server device, this is done by way of example only. In reality, some system components which are illustrated as a single entity can be divided into a plurality of interconnected computer devices. Likewise, in some cases, system components which are illustrated as separate entities may be consolidated in the same sub-system or device.

System 100 includes one or more promoter computer server devices 120. Promoters utilize promoter computer server devices 120 to monitor, manage and control metrics related to their campaigns, e.g. maintaining a campaign metadata database 122 (which includes for example some type of data storage infrastructure and service) or otherwise maintain data per campaign, including for example data pertaining to defining and customizing campaign attributes, relation to segments and segments attributes, proposed reward specifics for rewardable engagements on a campaign or campaign attributes per segment or segment attributes. In some examples, some or all of the monitoring and management may be done by utilizing the services of Security and Quality server 130, e.g. a computer server device of a third party providing such services to promoters 120.

According to some examples, various tracking technologies (engagements and conversion tracking technologies) are utilized in order to enable associations between engagements and conversions, for example, a third-party "tracking pixel" service that enables to distinguish between the context in which different engagements or conversions took place, to allow a more careful measurement of the metrics based on such additional tracking data. Such engagements and conversion tracking technologies are provided for example by Tracking Service computer server device 150. In some examples, Security and Quality server 130 also provides tracking services, e.g. servers 130 and 150 may be associated with the same third-party entity, or may be provided by the same set of interconnected server machines.

According to some examples, Security and Quality server 130 maintains, in real-time, data (which may also be referred to herein as "interaction data" or "usage data") on a plurality of campaigns, campaign attributes, segments and segment attributes, and the relation between them. Such interaction data includes, for example, metrics related to engagements, conversions, and the context in which they occur, as further described below (with reference to FIGS. 2, 2a, 2b, 2c and 3). Security and Quality server device 130 (e.g. utilizing Estimation Module 132) is configured and operable to generate, based on the interaction data or aggregations thereof, quality estimates that include, for example, estimated conversion scores (ECS) per campaign or campaign attributes, and estimated quality scores (EQS) for segments or segment attributes. Estimations (including estimated conversion scores and estimated quality scores) may include, for example, point estimates and/or confidence bounds, intervals, or other error estimates.

Consider for example that a certain campaign provided by a certain promoter is launched. Content associated with the campaign is presented at different segments (e.g. websites). For example, various websites can present clickable content (e.g. content items such as: banners, links, videos, images, etc.), exposing the campaign to viewers. The content related to the campaign can be provided for example by the promoter's servers 120 to the publishers' websites on server 140, or directly to user devices 110. The content may be integrated in the websites and displayed to viewers accessing these websites on their computer devices 110. Users who are exposed to the campaign may engage with the campaign (e.g. by clicking on the respective content, and later possibly also perform a desired action (i.e. "convert" or perform a conversion), e.g. donate to a cause, participate in a poll, download software, purchase a product, subscribe to a newsletter, fill out an online form, etc.) This can occur for a plurality of campaigns, each being published in a plurality of segments (e.g. websites).

Figure 2:
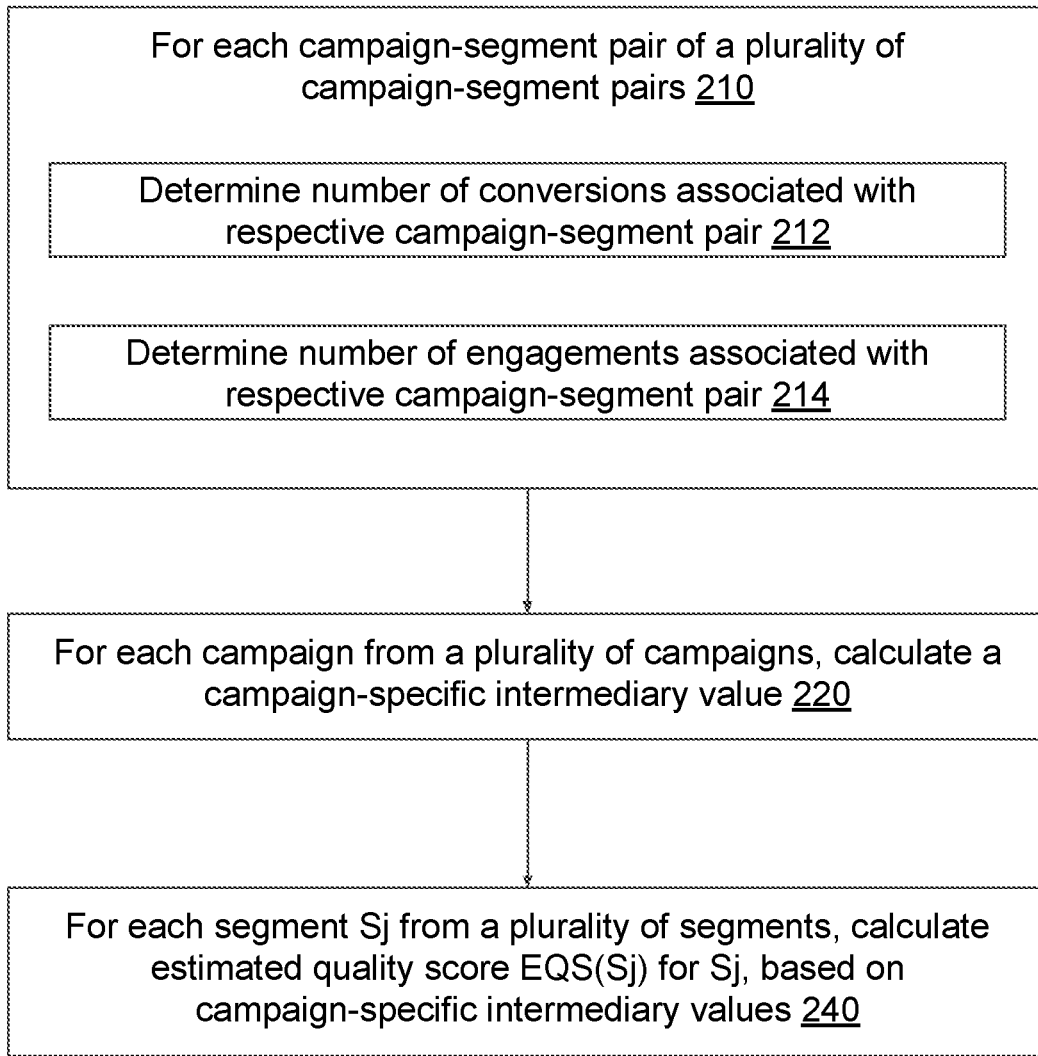
FIGS. 2, 2a, 2b and 2c are flowcharts showing operations carried out according to some examples of the presently disclosed subject matter.

Turning to FIG. 2, it shows a flowchart of operations carried out according to some examples of the presently disclosed subject matter. For each campaign-segment pair (i.e. a certain campaign presented in a certain segment) of a plurality of campaign-segment pairs, the number of engagements and the number of conversions associated with the campaign-segment pair (i.e. engagements of users with campaigns presented in the segment) can be determined individually (blocks 212, 214). In some examples, Security and Quality server device 130 (e.g. utilizing Estimation Module 132) is configured and operable to calculate a campaign-specific intermediary value for each campaign from a plurality of campaigns (block 220). Security and Quality server device 130 (e.g. utilizing Estimation Module 132) is further configured and operable to calculate, for each segment Sj from a plurality of segments, a respective segment-specific estimated quality score EQS(Sj) corresponding to that segment Sj, based on one or more campaign-specific intermediary values.

The calculation of intermediary values (FIG. 2, block 220) that are campaign-specific (or specific to sets of campaigns) for a plurality of campaigns is based on the number of engagements and conversions obtained for campaign-segment pairs (block 210), and the calculation of EQS values (block 240) for the plurality of segments is based on those campaign-specific (or specific to sets of campaigns) intermediary values.

Figure 2A:
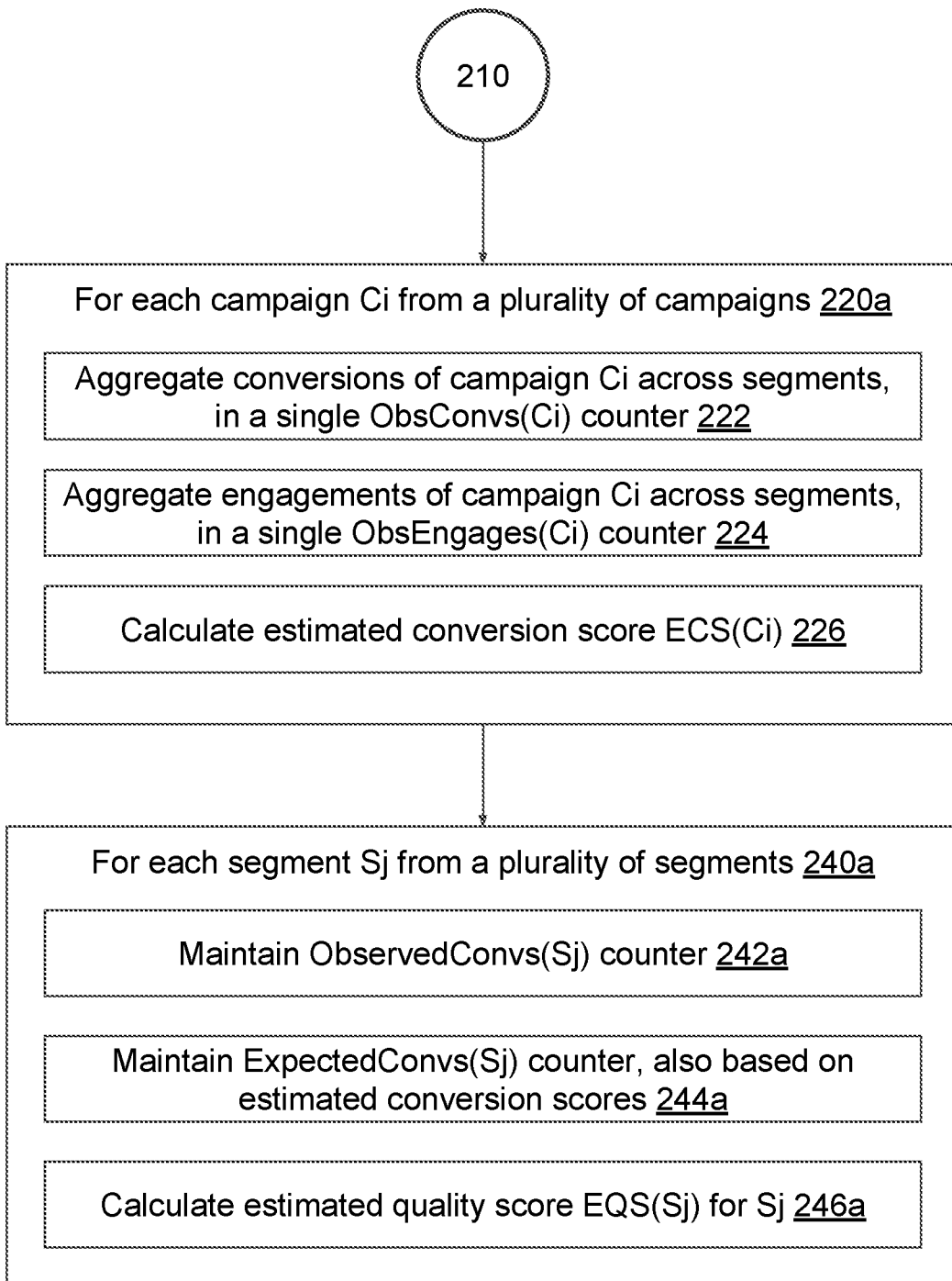
Figure 2B:
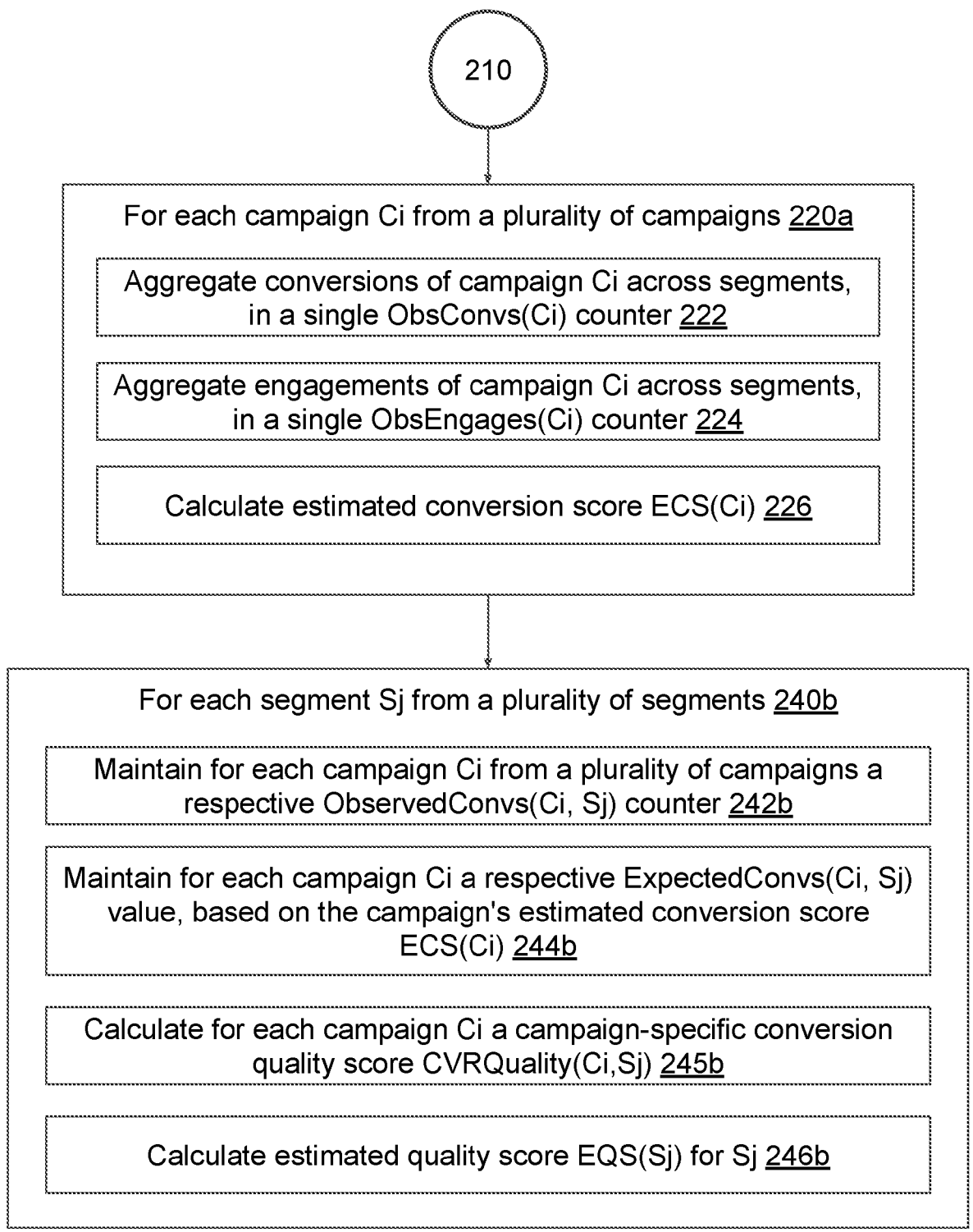
Figure 2C:
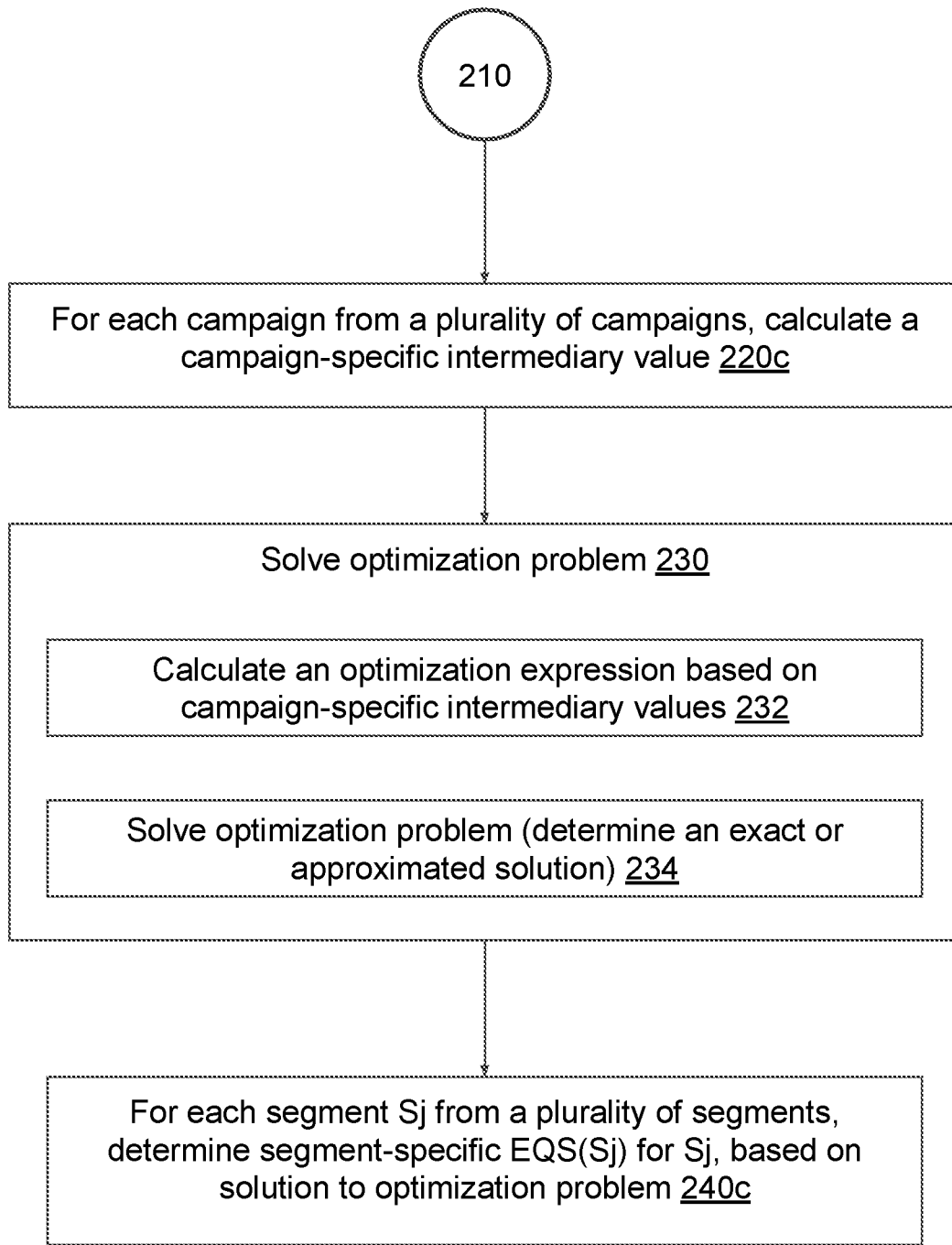

FIGS. 2a, 2b and 2c are flowcharts showing examples of variations of the process described above with reference to FIG. 2, according to some examples of the presently disclosed subject matter.

According to some examples, as indicated in block 220a in FIG. 2a, the following operations can be executed for each one of a plurality of campaigns Ci ("monitored campaigns"). In some examples, Security and Quality server device 130 (e.g. utilizing Estimation Module 132) is configured and operable to monitor campaigns which are presented in different segments, and to maintain for each campaign Ci of the monitored campaigns a counter ObsConvs(Ci) of the observed conversions of Ci occurring within a certain period of time (block 222), as well as a counter ObsEngages(Ci) of the observed rewardable engagements on Ci occurring within a certain period of time (block 224). The above counters are summed (aggregated) over a group of segments that display the campaign Ci. For example, the number of conversions recorded for each campaign-segment pair are aggregated over a group of segments to a single first value and the number of engagements recorded in each campaign-segment pair are summed (aggregated) over a group of segments to a single second value. Thus, according to one example, two counters can be maintained for each campaign. The first counter (ObsConvs (Ci)) is used for summing the observed conversions of a certain campaign Ci in a plurality of segments (e.g. websites) where it is being presented. The second counter (ObsEngages(Ci)) is used for summing the observed engagements of the campaign Ci in the plurality of segments (e.g. websites) where it is being presented.

It is noted that methods of monitoring engagements and conversions (e.g. using sampling methods by obtaining data on only a portion of the overall Internet traffic) are well known in the art and therefore are not explained in detail. It is also noted that the consideration of certain periods of time mentioned above (e.g. maintaining counters of engagements or conversions occurring within a certain period of time) should be broadly construed to include various methods, well known in the art, of maintaining values over time, e.g. maintaining a plurality of values (e.g. counters) corresponding to a plurality of periods of times (possibly overlapping, e.g. "sliding window" approaches); using a plurality of such values from different periods of time to monitor trends or estimate variability and other distribution characteristics; or including some "decaying" mechanism to give higher importance to more recent events (e.g. exponentially decaying the contribution of an event as time passes since the event has occurred).

Estimation Module 132 can be further configured and operable to calculate, for each one of the plurality of monitored campaigns, a respective campaign-specific intermediary value associated with the respective campaign (block 220 in FIG. 2). For example, a campaign-specific estimated conversion score ("ECS" or "ECS(Ci)" associated with a specific campaign Ci, otherwise referred to as EstCVR(Ci)), can be calculated (block 226 in FIG. 2a), serving as the respective campaign-specific intermediary value in the process of calculating an EQS (detailed below). For example, a respective campaign-specific score ECS(Ci) can be calculated based on the ratio between the first counter (ObsConvs(Ci)) and the second counter (ObsEngages(Ci)) (block 226), so that it is indicative of the probability of a conversion to occur for each engagement with a certain campaign Ci, independently of the segments in which it is being presented. It is noted that the plurality of segments used for calculating a campaign-specific ECS of one campaign may not be identical to the plurality of segments used for calculating a campaign-specific ECS of another campaign. In some cases, the pluralities of segments are identical, in some cases the pluralities of segments partially overlap, and in other cases the pluralities of segments are completely different.

In some examples, Estimation Module 132 is configured and operable to maintain more than one set of counters ObsConvs(Ci), or ObsEngages(Ci), or scores ECS(Ci) for a single campaign Ci, using different estimation or calculation techniques. Different techniques include for example:

Maintaining an alternative or an additional conversion counter ObsConvs2(Ci), e.g., this time giving a different weight to each of the conversions being counted, based on a weight associated with the segment in which the specific conversion occurred; maintaining an alternative or an additional conversion counter ObsConvs3(Ci), weighing the conversions being counted based on the value of the specific conversion; maintaining an alternative or an additional conversion counter ObsConvs4(Ci), weighing the conversions being counted based on the time that has passed since the respective engagement (e.g. considering only conversion in a certain time window, and/or exponentially decaying the importance of a conversion as time passes, etc.), or, similarly, maintain an additional or an alternative engagement counter ObsEngages2(Ci), possibly giving different weights to each engagement; or using other techniques for estimating conversion scores like ECS(Ci), e.g. using error estimates, confidence intervals, bounds etc.

If the number of campaigns considered by such process is denoted by ICI, in some examples Estimation Module 132 may generate and maintain an order of magnitude of only O(|C|) estimated conversion scores, e.g. ECS(Ci) above, for the various campaigns considered, while requiring a total of an order of magnitude of at most O(|C|) of CPU operations, as well as at most O(|C|) memory requirements.

Block 240a in FIG. 2a, refers to one example of calculation of the segment-specific estimated quality score EQS (Sj) mentioned above with respect to block 240. The following operations are executed for each one of a plurality of segments Sj ("monitored segments") for calculating a respective estimated quality score (EQS(Sj); also referred to herein as "segment-specific EQS").

In one example, Estimation Module 132 maintains for a certain segment Sj (possibly for more than one) a counter (ObservedConvs(Sj)) for counting the observed (monitored/actual) conversions occurring over a period of time in all campaigns in a group of campaigns which are presented in segment Sj, regardless of the specific campaigns associated with these conversions (block 242a). Estimation Module 132 further maintains a value (ExpectedConvs(Sj), also referred to below as "segment-specific expected conversions value") that represents the expected number of conversions in segment Sj (block 244a). According to one example, ObservedConvs(Sj) counter and ExpectedConvs(Sj) values are both calculated over a plurality of campaigns, such that for each monitored segment a single respective ObservedConvs(Sj) and a single ExpectedConvs(Sj) are maintained.

According to some examples of the presently disclosed subject matter, ExpectedConvs(Sj) is calculated in the following manner: for every observed engagement occurring in a given segment Sj, for example, an engagement associated with a certain campaign Ci, the respective estimated conversion score ECS(Ci) (campaign-specific, calculated as described above with reference to blocks 222 to 226) corresponding to that certain campaign Ci is added to the value ExpectedConvs(Sj). This is also mathematically equivalent to multiplying the number of engagements observed in each campaign Ci by the campaign-specific ECS(Ci) of that campaign. Notably, the group of campaigns used above (monitored campaigns in block 220 or 220a) are possibly, but not necessarily, identical to the group of campaigns which are used in blocks 242a and 244a.

Estimation Module 132 may further generate a segment-specific EQS (estimated quality score, also otherwise referred to as EstQUALITY(Sj)) corresponding to segment Sj, e.g. based on the ratio between ObservedConvs(Sj) and ExpectedConvs(Sj) (block 246a). The EQS of a given segment is indicative of the ratio between the observed conversions in a certain segment (e.g. a certain website) and the expected conversions in that same segment, calculated based on the campaign-specific ECSs of a plurality of campaigns presented in the given segment. Thus, the EQS provides, inter alia, an indication of a relative level of lower quality or "intent-less" engagements in the given segment. For example, if the segment-specific EQS calculated for a certain website shows that the ratio between the observed conversions and the expected conversions is low (e.g. lower than 1.0 or lower when compared to other time periods or to similar segments), this may indicate that a considerable portion of the engagements in the website are of low quality in the sense of having lower chances to lead to conversions, i.e. are intent-less or even fraudulent engagements. Furthermore, as explained below, a segment-specific EQS can be used for adapting the reward offered for each rewardable engagement according to the actual quality of those engagements, according to the respective segment-specific EQS.

Similarly to considerations mentioned above in the process of estimating counters and conversion scores related to certain campaigns, Estimation Module 132 may maintain more than one set of counters and scores ObservedConvs(Sj), ExpectedConvs(Sj) and EQS(Sj) for each segment Sj, using different estimation or calculation techniques. Different techniques include for example: Maintain an alternative or additional counter ObservedConvs2(Sj), this time associating different weights to different conversions depending on the campaign associated with the specific conversion, or capping the contribution of certain campaigns (e.g. cap their number of observed engagements), and similarly for ExpectedConvs(Sj) and EQS(Sj) (e.g. one EQS(Sj) calculated to determine "significance" of existence of fraud or low quality, another EQS2(Sj) calculated differently to estimate the "effect size" of such fraud, or low quality).

If the number of segments considered by such process is denoted by |S|, Estimation Module 132 may generate and maintain an order of magnitude of O(|S|) estimated quality scores, e.g. EQS(Sj) above, for the various segments considered, thus requiring a total of an order of magnitude of at most O(|C|+|S|) of CPU operations, as well as at most O(|C|+|S|) memory requirements.

Turning now to FIG. 2b, this illustrates a flowchart showing another example of the process described above with reference to FIG. 2, according to some examples of the presently disclosed subject matter. According to this approach, operations described above with reference to block 220a in FIG. 2a are also executed, to thereby generate a campaign-specific ECS for each campaign of a plurality of campaigns (the campaign-specific ECS values being the campaign-specific intermediary values).

In block 240b in FIG. 2b, similar to block 240a in FIG. 2a, a segment-specific EQS is calculated for one or more segments of a plurality of segments, albeit in a somewhat different manner. Similar to block 240a, according to block 240b for at least one given segment, the number of observed conversions and the number of expected conversion of each one of a plurality of campaigns presented in the given segment, are determined.

At block 242b for a certain (possibly more than one) segment Sj, a counter (ObservedConvs(Ci,Sj)) is maintained for each campaign of a plurality of campaigns presented in the segment Sj for counting the observed (monitored, actual) conversions occurring over a period of time in each specific campaign Ci.

At block 244b for the certain segment Sj another value (ExpectedConvs(Ci,Sj)) is maintained for each campaign of a plurality of campaigns presented in the segment Sj representing the expected number of conversions occurring over the period of time in each specific campaign Ci.

According to some examples of the presently disclosed subject matter, ExpectedConvs(Ci,Sj) is calculated in the following manner: for every observed engagement occurring in a given segment Sj and a given campaign Ci, a respective campaign-specific ECS (ECS(Ci), calculated as described above with reference to blocks 222 to 226) corresponding to the given campaign Ci, is added to a value ExpectedConvs(Ci,Sj).

At block 245b a campaign-specific conversion quality score (campaign-specific CVRQuality(Ci,Sj)) is calculated, e.g. based on a ratio between the respective ObservedConvs (Ci,Sj) and the respective ExpectedConvs(Ci,Sj) to thereby obtain an estimated conversion quality score for the specific campaign Ci in the plurality of campaigns, when presented in a specific segment Sj.

At block 246b a segment-specific EQS for segment Sj is calculated based on the plurality of campaign-specific conversion quality scores. This can be done for example by calculating an average of the plurality of campaign-specific conversion quality scores. Alternatively or additionally, a segment-specific EQS for segment Sj can be calculated at block 246b by assigning a certain weight to each campaign-specific conversion quality score, and then calculating the weighted average of those scores. The weight of a campaign may depend on characteristics or metrics related to the campaign (e.g. the number of observed engagements in that campaign).

Turning to FIG. 2c, it is a flowchart showing a further example of the process described above with reference to FIG. 2. In the process of solving an optimization problem (block 230 in FIG. 2c), data on campaign-segment pairs (the data including for example, observed engagements, observed conversions, expected conversions, possibly weighted, as determined for example in block 210 in FIG. 2) is considered per campaign or per a set of campaigns, and used in formulating a mathematical expression ("optimization expression", block 232 in FIG. 2c) that is used in an optimization problem (block 230). The optimization expression can include campaign-specific intermediary values (block 220c, or intermediary values that are specific to sets of campaigns for a plurality of campaigns). The optimization expression can be expressed as involving segment-specific variables (e.g. segment-specific EQS values).

Various methods can be used for solving the optimization problem (block 234), the solution of which may include a set of segment-specific EQS values for a plurality of segments (block 240c). These segment-specific EQS values may be indicative of a level of intent-less engagements in their respective segments. As explained above, such EQS values are indicative of engagement fraud or otherwise low quality engagements, and facilitate their mitigation.

In some examples, the value of the optimization expression (block 232) may be indicative of the variability of a campaign across segments, e.g. the variability of the level of intent-less engagements in a campaign across segments; or the variability of the expected reward for an engagement associated with that campaign across segments; or the variability of the total expected reward of each conversion (herein below "CONVGOAL") on that campaign across segments; or the variability (across segments) of the likelihood of an engagement on that campaign to become a conversion. Similarly, the value of the optimization expression may be indicative of the variability of a segment across campaigns, or a variability across both campaigns and segments. In case the optimization expression is indicative of a variability, various methods can be used to determine variables (e.g. segment-specific EQS values) that minimize its total value when solved (where in some cases providing an approximated solution).

Examples of calculation of the campaign-specific intermediary values (block 220c; denoted below by "VALUE (Ci)" for a respective campaign Ci) and the optimization expression (block 232), are provided below. These calculations are based on data of a given plurality of campaigns in a given plurality of segments, in the following manner:

1. For each campaign Ci of the plurality of campaigns, calculate the ratio between the aggregated conversions of the campaign Ci across segments (in a similar manner to the calculation of ObsConvs(Ci), block 222) and the aggregated engagements of the campaign across segments (in a similar manner to the calculation of ObsEngages(Ci), block 224), thereby obtaining a campaign-specific intermediary value VALUE(Ci) (in a similar manner to the calculation of the estimated conversion score ECS(Ci) calculated in block 226);
2. For each pair of campaign Ci and segment Sj in the given pluralities of campaigns and segments, calculate a pair-specific value PSVALUE(Ci,Sj) based on the ratio of the number of conversions of campaign Ci in segment Sj and the number of engagements of campaign Ci in segment Sj;
3. Calculate the optimization expression to be the sum of all pluralities of campaigns and segments of the squared differences between the respective VALUE and PSVALUE values, the latter weighted by a segment-specific parameter EQS, which can be represented by the following mathematical notation:

optimization expression=$\Sigma_c \Sigma_s [EQS(s)*PSVALUE(c, s)-VALUE(c)]^2$;

4. Use methods well known in the art (e.g. Gradient Descent, Lagrange Multipliers, and other optimization methods) to solve the optimization problem (e.g. minimize the optimization expression, either accurately or approximately), to thereby obtain segment-specific parameters EQS from the solution to the optimization problem (block 240c).

In other examples, the campaign-specific intermediary values (block 220c, denoted below by VALUE2(Ci) for a respective campaign Ci) and the optimization expression (block 232) are calculated, based on data for a given plurality of campaigns in a given plurality of segments, in the following manner:

1. Modify the calculation of the campaign-specific intermediary value VALUE(Ci) to calculate VALUE2(Ci)=REWARD(Ci)/VALUE(Ci), where REWARD(Ci) is a reward associated with the campaign Ci;
2. Modify the calculation of PSVALUE(Ci,Sj) corresponding to a pair of campaign Ci and segment Sj to calculate PSVALUE2(Ci,Sj)=REWARD(Ci)/PSVALUE(Ci,Sj);
3. Calculate the optimization expression with segment-specific parameters EQS in similar to above (but using the modified values VALUE2 and PSVALUE2):

optimization expression=$\Sigma_c \Sigma_s [EQS(s) * PSVALUE2(c,s) - VALUE2(c)]^2$;

4. Solve optimization problem similar to the above, thereby obtaining segment-specific parameters EQS from the solution to the optimization problem (block 240c).

In other examples, the optimization expression can be modified to further include pair-specific weights, for example (e.g. using VALUE and PSVALUE calculated above):

optimization expression=$\Sigma_c \Sigma_s [EQS(s) * WEIGHT(c,s) * PSVALUE(c,s) - WEIGHT(c,s) * VALUE(c)]^2$;

In some examples, the pair-specific weight WEIGHT(C, S) is the number of observed engagements in campaign C in segment S. In other examples, WEIGHT(C,S) is the total reward given for engagements in campaign C in segment S. In other examples, the pair-specific weights can further be adjusted by associating a different weight per engagement or per conversion or per campaign, e.g. by associating a lower weight or importance to engagements on campaigns with high Pr(engagement|view), e.g. a weight of 1/Pr(engagement|view).

Other formulations of the optimization problem (e.g. not using sums of squared differences, but other optimization expressions) may likewise be used, depending on the desired functionality from the method or system, and accordingly determine segment-specific EQS based on the solution to the optimization problem. For example, as explained above, the optimization expression may be indicative of a certain variability, and so such expression may be used (block 232) if the method or system requires that certain variability needs to be optimized (e.g. minimized).

According to some examples, in addition to calculating segment-specific EQS values for a certain segment Sj as described with respect to FIGS. 2, 2a, 2b and 2c, estimated quality scores for pairs of campaigns and segments (herein "pair-specific quality scores") can also be calculated. Designated counters of the observed engagements and observed conversions of a certain campaign Ci when presented in a segment Sj can be maintained, and a pair-specific quality score for that campaign-segment pair (campaign Ci and segment Sj) can be calculated based on these counters (e.g. as the ratio between their values). According to some examples, the EQS assigned to a specific campaign Ci in the context of a segment Sj is calculated as an "adaptive EQS", based on a combination of a segment-specific EQS value associated with Sj and a pair-specific quality score corresponding to the campaign-segment pair. According to some examples, the adaptive EQS is calculated as a weighted combination of the respective EQS value and the respective pair-specific quality score, where the weights are adapted as information is being gathered with respect to the campaign-segment pair. At the start, when little or no information pertaining to the specific pair is available, a greater weight is given to the segment-specific EQS value. As more information is recorded and becomes available for calculating a more statistically valid pair-specific quality score, the weight assigned to the segment-specific EQS value decreases, and the weight assigned to the pair-specific quality score increases, possibly to a point where the adaptive EQS is calculated, based only on the pair-specific quality score.

In some examples, information on attributes of campaigns and/or attributes of segments may be used to determine a relationship between campaigns and/or segments. An example relationship is a tree hierarchy between campaigns and/or segments relationship. Another example relationship is a more general similarity measure between campaigns and/or segments (e.g. according to the number of attributes shared between them). Such relationships may be used to generate a plurality of estimates, utilizing multiple estimation methods, e.g. by generating a hierarchy of estimated scores, such that when data on a certain campaign with respect to a certain segment is insufficient, other estimates may be used (e.g. "higher" levels in a hierarchy of estimates, taking into account additional data maintained on other campaigns with similar attributes and/or in relation to other segments with similar attributes).

For example, using notations from above, an estimated conversion score ECS(Ci) of a campaign Ci may be calculated using data that includes observed conversions and/or observed engagements of other campaign(s) that are related or similar to Ci according to a relationship between the campaigns. As another example, using notations from above, is calculating an estimated quality score EQS(Sj) for a segment Sj using data that includes observed conversions and/or expected conversions of other segment(s) that are related or similar to Sj according to relationships between the segments.

As another example, reverting to the calculations demonstrated above, Estimation Module 132 can be configured and operable to calculate estimated quality score EQS(Sj) for segment Sj based on ObservedConvs(Sj) and ExpectedConvs(Sj) as detailed above (e.g. blocks 242a and 244a in FIG. 2a, or blocks 242b and 244b in FIG. 2b), and generating a confidence interval or other error estimates associated with EQS(Sj), using statistical methods known in the art. In some cases, Estimation Module 132 can consider a set of segments Set(Sj) associated with Sj, e.g. having similar segment attributes as described herein above. For example, this may be the case in the event that error estimates (as indicated for example based on a ratio between ObservedConvs(Sj) and ExpectedConvs(Sj)) exceed a certain threshold value, and additional data is needed in order to verify the initial results pertaining to a single segment.

By monitoring the engagements and conversions on this set of segments Set(Sj), Estimation Module 132 may calculate and maintain counters ObservedConvs2(Set(Sj)) and ExpectedConvs2(Set(Sj)) in a manner similar to the above, but, this time considering engagements and conversions occurring in any of segments of Set(Sj), and not just those in Sj, in order to utilize the larger amount of data associated with Set(Sj). Estimation Module 132 may then calculate an estimated quality score EQS2(Sj) based on ObservedConvs2 (Set(Sj)) and ExpectedConvs2(Set(Sj)) so it is based on a larger amount of data. In one example, Estimation Module 132 can be configured and operable to consider a relationship (e.g. hierarchy) of segments and consider in the calculations an increasing number of segments in accordance with the hierarchy, until the requirements for statistical significance from the estimates (e.g. requirement for small confidence interval) are satisfied.

Similarly, Estimation Module 132 can be configured and operable to consider a set of campaigns Set(Ci) associated with campaign Ci in order to maintain counters and scores ObsConvs(Set(Ci)), ObsEngages(Set(Ci)) and EstCVR(Ci) associated with a campaign Ci or a set Set(Ci) that relies on more data. According to some embodiments, different campaigns, campaign attributes, segments, or segment attributes may be associated with different weights in the calculation of the quality estimates in accordance with different model assumptions, e.g. assume same weights, or a relative weight with respect to some other metric (e.g. number of engagements), include capping techniques (e.g. cap on the number of engagements) to limit the impact on the resulting estimate, or use other methods to provide credible quality estimations.

Thus, consider for example a certain promoter running a campaign in a certain website for a very short time and having very little information (or even no information at all, e.g. at the early stage of the campaign) that can provide a statistically valid quality estimation. According to the presently disclosed subject matter, Estimation Module 132 is capable of utilizing data from engagements and conversions across various campaigns and segments other than those of that certain promoter, to obtain more "robust" estimations (namely ECS(Ci) or EQS(Sj)) that are statistically valid (as they rely on more data), thereby allowing the certain promoter to estimate the expected quality of engagements on a (possibly new) campaign across different segments, even right from an early stage.

According to some examples, Estimation Module 132 is configured and operable to calculate a comparative/relative level of intent-less engagements between at least two segments (or segment attributes), thereby allowing to compare between two segments even when each of these segments presented a distinct set of campaigns (e.g. even if there was not a single campaign for which data was collected with respect to both segments). In some examples, this comparative/relative level between the segments can be calculated based on the respective calculated segment-specific EQS values.

According to some examples, calculation of the quality estimates may be "cascaded" in a sense, by further taking into consideration other estimates that are not directly related to metrics of engagements and conversions. For example, calculation of the first quality estimates EQS(Sj) that are related to engagements and conversions may further utilize a second set of quality estimates, this time related to engagements and another type of event/step in the user funnel. This second set of quality estimates may, for example, relate to the probability of a rewardable engagement to occur, given that another step in the user funnel was satisfied (e.g. a page view, if a rewardable engagement is a click, assuming that certain views by users or "simulated users" may involve click fraud). In this way, the first set of quality estimates may take into account the second set of quality estimates in order to more accurately capture the expected nature of the engagement fraud, or assumptions on its distribution. In other words, not all engagements are equally susceptible to engagement fraud, and thus have to be "weighted" accordingly, using a second set of estimates.

For example, if intent-less (e.g. actual fraud, or "deficient" due to UI or UX, or otherwise of lower quality) engagements are distributed uniformly over views (e.g. bots or scripts perform click fraud uniformly over page views), then campaigns for which Pr(engagement|view) is low, would be more susceptible to intent-less engagements, depending on views. One example of adapting assumed fraud distribution can be to modify the EQS calculation processes by associating a lower weight or importance to engagements on campaigns with high Pr(engagement|view), e.g. a weight of 1/Pr(engagement|view). Other examples of adaptations can include corrections for other assumed distributions of such intent-less engagements, e.g. fraudulent engagements biased towards campaigns with higher associated REWARDS (e.g. humans hired for performing click fraud deliberately on campaigns with higher associated REWARDS).

Figure 3:
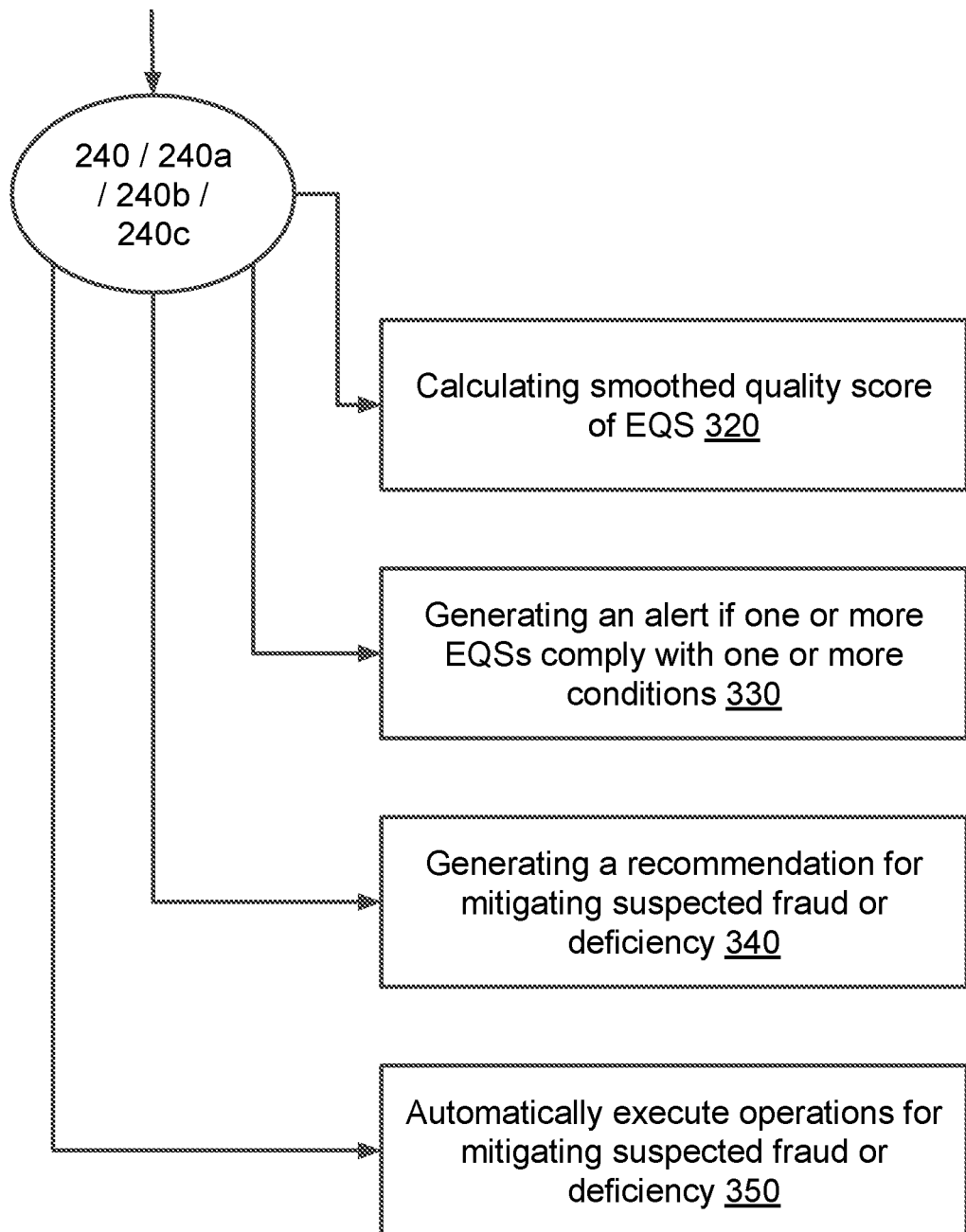
FIG. 3 is a flowchart showing additional operations carried out, following calculation of estimated quality score(s) according to some examples of the presently disclosed subject matter.

According to some examples, multiple estimation processes, each for calculating a respective estimated quality score (EQS) of a certain segment, can be executed. For example, one estimated quality score EQS1 can be calculated according to the process described in FIG. 2a, another estimated quality score EQS2 is calculated as described the process described in FIG. 2a with the adaptation detailed according to FIG. 2b, and three additional estimated quality values EQS3, EQS4 and EQS5 may be calculated, each considering different relationships between campaigns or segments as described above. The different EQS values EQS1-EQS5 can be combined into a single estimated quality score EQS=f(EQS1,EQS2, . . . , EQS5), using some function f( ). An example of the function f( ) can be: Average, Max, Min, Median, but also a regression, classifier, or other machine learning algorithm, as is well known in the art. FIG. 3 is a flowchart of operations carried out following calculation of one or more estimated quality scores, according to some examples of the presently disclosed subject matter. FIG. 3 shows different optional and independent processes that can be executed following calculation of the EQS.

At block 320 a smoothing process of the estimated quality score is executed. In some examples, estimated scores, e.g. estimated EQS(Sj) corresponding to a certain segment Sj or estimated conversion score ECS(Ci) corresponding to a certain campaign Ci, can further undergo a smoothing process, e.g. to get rid of outlier data, or to ensure that estimates are within certain specified bounds, or that they follow a certain desired distribution etc. As a concrete example for illustrative purposes, Estimation Module 132 can be configured and operable to further calculate a smoothed estimated quality score sEQS(Sj) (also herein EstQUALITYs(Sj)) based on scores EQS(Sj) associated with Sj, e.g. sEQS(Sj)=max(A+EQS(Sj)/B, C), for some constants A, B and C. This way, for example, the smoothed estimated quality scores EQS(Sj) are ensured to be bounded by C.

Fraud and Deficiency Detection Module 134 is configured and operable to monitor the data and the generated estimated scores (e.g. EQS(Sj) or sEQS(Sj), possibly more than one score associated with a certain segment Sj), in order to identify real-time segments or segment attributes that are suspected of being subjected to fraudulent or otherwise intent-less engagements with regard to certain campaigns or campaign attributes. A significant amount of fraudulent engagements may be used for identifying engagement fraud (or suspicion thereof) or otherwise deficiency (low quality user interaction, e.g. due to poor user interface).

At block 330 an alert is generated (e.g. by Fraud and Deficiency Detection Module 134) in case one or more of the calculated estimated quality scores comply with one or more conditions. For example, one or more EQS values of one or more segments can be continuously monitored, and in case the monitored values comply with one or more predefined conditions, an alert is generated. Conditions can include for example: EQS is above or below a certain predefined threshold value; or EQS of a certain segment shows significant difference to EQS values of other similar segments; or a change or anomaly in EQS trend is noted; or applying change-detection techniques known in the art; etc. The alert can be executed in any way known in the art. For example, an alert can be a message (that can include for example, a specific displayed graphics and/or sound etc.) that is sent to and displayed on a computer device (e.g. smartphone) of a promotor and/or advertiser indicating detected EQS values.

Fraud and Deficiency Detection Module 134 may further issue relevant alerts or warnings accordingly to stakeholders, e.g. to a promoter whose campaign is or was distributed in association with such problematic (e.g. fraudulent) segments or segment attributes. Such warnings can be based, in some examples, on a plurality of quality estimates, or include confidence scores, as well as textual or other supplemental explanations detailing possible causes for a suspected fraud or deficiency (e.g. if a certain segment attribute or a certain campaign attribute or a certain campaign is particularly suspicious of being the cause for the overall suspected fraud, then information on that cause may be supplied together with the issued warnings). In some examples, a warning message can be sent to a computer device (e.g. smartphone) of a promoter, the smartphone having a relevant application installed thereon. The received warning can be displayed on a computerized device (e.g. smartphone) indicating suspicion that a significant amount of intent-less engagements (e.g. suspected engagement fraud) has been detected.

In some embodiments, Security and Quality server 130 can be configured and operable to further provide campaign management services to promoters' server(s) 120. Campaign management services may be provided via a graphical user interface, e.g. a website or an application on a mobile device of promoter, campaign management services including for example: allowing a promoter to create, update, delete a campaign, and its associated metadata (e.g. the promoted content, specific budget and other requirements). In some examples, promoter may use campaign management services provided by Security and Quality server 130 to set and update a certain reward amount REWARD(Ci,Sj) for engagements on his campaign Ci in segment Sj, e.g. according to real-time indications of the EQS. Given a campaign Ci in segment Sj, the promoter may update the rewards such as REWARD(Ci,Sj) either manually or via an API included in the campaign management services.

In addition to, or instead of providing alerts, Fraud and Deficiency Detection Module 134 can be configured and operable to provide suggestions on how to mitigate detected intent-less (e.g. deficient or fraudulent) engagements. This can be achieved for example, by generating recommendations for updating the rewards associated with campaigns or campaign attributes in relation to segments and segment attributes. As mentioned above, this can be carried out by continuously monitoring one or more EQS values of one or more segments, and generating a recommendation in case the monitored values comply with one or more predefined conditions.

According to some examples, generation of recommendations for updating rewards can be executed for example, periodically, upon initiated request, or in response to detection of a change (e.g. above some predefined threshold value) in the calculated EQS values, to thereby continuously adapt (e.g. every few seconds, every few minutes, every few hours, or as necessary) the recommended rewards to real-time changes in the quality of the engagement. According to this approach, any change in the quality of the engagements can be detected and induce an appropriate recommendation to update the reward.

In addition to or instead, generation of recommendations for updating rewards can be executed in response to detection of a change in the calculated EQS values that is indicative of a suspected engagement fraud or otherwise a substantial degradation in engagement quality (e.g. due to degradation in UI quality).

As a concrete example, in case the estimated quality scores indicate with a high probability that about 33% of the rewardable engagements in a certain segment Sj are engagements (e.g. a dishonest publisher controlling the segment Sj has actively added fraudulent engagements on top of the legitimate engagements occurring in Sj, in a ratio of 1:2, i.e. one fraudulent engagement for each 2 legitimate engagements), then Fraud and Deficiency Detection Module 134 may recommend that a promoter of a certain campaign Ci should adapt his offered reward REWARD(Ci,Sj) for engagements on campaign Ci in Sj. Adaptation of the reward can be done for example, by multiplying the current reward by the quality score to thereby get a new reward value. In the current example, REWARD(Ci,Sj) can be multiplied by about 67%, i.e. update REWARD(Ci,Sj) to offer a lower reward of about 0.67*REWARD(Ci,Sj). Such recommendations may be provided to a promoter device 120 via an application installed on promoter device 120, or via Security and Quality server 130 as part of the campaign management service, e.g. in a dedicated GUI application.

Notably, Fraud and Deficiency Detection Module 134 may recommend real-time updates to REWARD values regardless of whether an alert is issued or not. Such REWARD updates may mitigate engagement fraud, and may in fact bridge the technological gap in the ecosystem (rewarding engagements, while being more interested in conversions), i.e. correctly accounting for the quality of engagements to offer a more accurate REWARD for engagements of estimated lower quality, thereby in particular dis-incentivizing engagement fraud, and incentivizing fixing UI and UX issues.

In some examples, Security and Quality server 130 (e.g. by Estimation Module 132 or Fraud and Deficiency Detection Module 134) can be configured and operable to automatically apply these recommended updates (e.g. on behalf of a promoter 120 according to a policy and specific constraints that were agreed upon in advance, as part of the campaign management service) thereby automatically providing protection, in real-time, from intent-less (fraudulent or otherwise deficient or low quality) engagements. Thus, EQS values can be continuously monitored and enable to automatically adapt the reward accordingly in order to mitigate the effect of intent-less engagements, and reducing the incentive to deliberately generate such engagements, as well as increasing the incentive to actively fix UI or UX issues that may damage user experience.

Some implementations of the disclosed processes have considerably lower requirements on the number of CPU operations and memory requirements. Namely, using the notations above, at most O(|C|) memory and CPU requirements to enable the generation of estimated conversions scores ECS(Ci), and at most O(|C|+|S|) memory and CPU requirements to enable the generation of estimated quality scores EQS(Sj) or sEQS(Sj). Note that these bounds remain essentially the same even if multiple estimates and scores are calculated for each campaign or for each segment, as exemplified above. In particular, this leads to a performant and scalable approach, able to accommodate an increasing number of campaigns and segments, as well as an increasing number of campaign attributes and segment attributes.

In addition, by leveraging the data being used across segments and campaigns, not all promoters need to bother with technological efforts, such as installing a "tracking pixel" or integrating with a Tracking Service server. Apart from saving these technological efforts for promoters, even in cases where data with respect to engagements and/or conversions is unavailable to a certain campaign-segment pair (e.g. some tracking technologies are incompatible for some pairs of campaigns and segments (e.g. HTML vs. Flash and other various technological constraints)), then the technologies disclosed herein can be used for determining the needed EQS for that certain campaign-segment pair, based on other campaign-segment pairs.

Likewise, the presently disclosed subject matter is applicable for new campaigns, small campaigns, segments with relatively little traffic usage or exposure etc., or pairs of campaigns and segments with relatively little data in a certain considered period of time. Namely, estimating a conversion score ECS(Ci) for a campaign Ci considers engagements and conversions related to campaign Ci across different segments, and thus enjoys a larger amount of data that facilitates a more efficient use of data towards a more credible estimation (also see above the remark about considering sets of campaigns Set(Ci) to further consider more data when necessary).

Similarly, Estimation Module 132 is capable of generating estimated quality scores EQS(Sj) for a segment Sj based on data for that segment Sj across different campaigns, and so even if a specific pair of campaign Ci and segment Sj had very little usage data as a pair (i.e. there was a relatively small number of engagements and/or conversions on campaign Ci in segment Sj; for example if Ci was never displayed in the context of the segment Sj), the estimates and scores generated by Estimation Module 132 may still be useful. This may be compared to other common approaches that are inapplicable to such cases, from an information-theoretic perspective (regardless of their CPU and memory requirements).

Furthermore, due to the efficient use of available information across campaigns and segments, Security and Quality server 130 and the processes described herein adapt to real-time trends in frauds and quality changes, and help to mitigate fraud as it appears (e.g. by automatically updating the rewards offered by a campaign Ci to engagements in Sj, according to EQS(Sj)), so that in some cases no single campaign will be dramatically affected by such fraud. In essence, the disclosed subject matter improves the efficiency of the ecosystem by dis-incentivizing fraudulent engagements, and incentivizes publishers 140 and other players in the ecosystem to fix issues in user interfaces and user experiences, or otherwise improve them, as explained above.

Likewise, the presently disclosed subject matter contemplates a computer program being readable by a computer device for executing the method of the presently disclosed subject matter. The presently disclosed subject matter further contemplates a computer-readable non-transitory memory tangibly embodying a program of instructions executable by a computer device for executing the method of the presently disclosed subject matter.

The invention claimed is:

1. A computer-implemented method comprising:

for each given campaign of a first plurality of campaigns, monitoring engagements and conversions of the given campaign when presented in a plurality of traffic segments, wherein each of the plurality of traffic segments comprises traffic related to a plurality of users;

calculating an aggregated conversion rate of each given campaign of the plurality of campaigns when presented in the plurality of traffic segments, said calculating the aggregated conversion rate of each given campaign comprising:

obtaining a first sum of observed conversions of the given campaign when presented in the plurality of traffic segments;

obtaining a second sum of observed engagements of the given campaign when presented in the plurality of traffic segments; and calculating the aggregated conversion rate of the given campaign based on the first sum and the second sum, wherein the aggregated conversion rate indicates a probability of a conversion to occur for an engagement with the given campaign when presented in any of the plurality of traffic segments; and for a given traffic segment presenting one or more campaigns of the plurality of campaigns, calculating an estimated quality score of the given traffic segment, said calculating the estimated quality score of the given traffic segment comprising:

determining a third sum of observed conversions in the one or more campaigns when presented in the given traffic segment;

determining an expected sum of conversions of the one or more campaigns based on aggregated conversion rates of the one or more campaigns, as calculated in said calculating the aggregated conversion rate of each given campaign, and based on a number of observed engagements with each one of the one or more campaigns when presented in the given traffic segment; and based on the third sum of observed conversions and the expected sum of conversions in the given traffic segment, calculating the estimated quality score of the given traffic segment, wherein the estimated quality score of the given traffic segment is EQS being indicative of a quality level of the observed engagements with the each one of the one or more campaigns when presented in the given traffic segment, wherein a quality level that is below a threshold indicates that the observed engagements comprise at least some intent-less engagements or fraudulent engagements in the given traffic segment.

2. The method of claim 1, wherein each traffic segment from the plurality of traffic segments is associated with a different content publisher.

3. The method of claim 1, wherein said calculating the estimated quality score further comprises:

assigning a respective weight to each campaign of the one or more campaigns;

summing in the third sum a weighted value of the observed conversions determined in the one or more campaigns in the given traffic segment, according to the respective weight;
summing a weighted value of the expected sum of conversions of the one or more campaigns according to the respective weight, to thereby obtain a segment-specific expected conversions value; and
calculating the estimated quality score for the given traffic segment, based on a ratio between the third sum and the segment-specific expected conversions value.

4. The method of claim 1 further comprising, performing at least one of (i) and (ii):
i. determining that an association exists between first and second campaigns of the plurality of campaigns; and
calculating an aggregated conversion rate of the first campaign using data that includes observed conversions and observed engagements of Vie second campaign,
ii. determining, that an association exists between first and second traffic segments of the plurality of traffic segments; and
calculating a segment-specific estimated quality score of the first traffic segment using data that includes observed conversions and expected conversions Of the second traffic segment.

5. The method of claim 1 further comprising:
for a specific campaign from the one or more campaigns, calculating an adaptive estimated quality score of the specific campaign indicating an estimated quality score of the specific campaign when presented in the given traffic segment, said calculating the adaptive estimated quality score comprising:
determining a fourth sum of observed engagements with the specific campaign when presented in the given traffic segment;
determining a fifth sum of observed conversions in the specific campaign when presented in the given traffic segment;
calculating a pair-specific quality score of the specific campaign based on a ratio between the fourth sum and the fifth sum;
calculating the adaptive estimated quality score of the specific campaign based on a combination of a weighted value of the estimated quality score of the given traffic segment and a weighted value of the pair-specific quality score.

6. The method of claim 1 further comprising at least one of:
i. assigning a respective first weight to each engagement;
ii. assigning a respective second weight to each conversion; and
iii. assigning a respective third weight to each campaign.

7. The method of claim 1 further comprising:
in the event that the quality level is below the threshold, generating an alert.

8. The method claim 1 further comprising: determining the estimated quality score of the given traffic segment based on a ratio between the third sum of observed conversions and the expected sum of conversions in the given traffic segment.

9. The method of claim 1 further comprising: upon determining that the observed engagements comprise the at least some intent-less engagements or fraudulent engagements, performing one or more of:
generating an alert indicating a suspicion of an engagement fraud; and
executing a preventive action directed for mitigating the engagement fraud.

10. The method of claim 1, wherein a reward is given per a user engagement with content of the one or more campaigns presented in the given traffic segment, the method further comprising:
automatically updating a value of the reward according to the estimated quality score of the given traffic segment, thereby mitigating intent-less engagements.

11. The method of any one of the preceding claims, wherein the given traffic segment is associated to any one of: a website; a time frame; and a group of users having one or more common characteristics.

12. A computerized device comprising one or more computer processors configured and operable to:
for each given campaign of a plurality of campaigns, obtain information pertaining to engagements and conversions of the given campaign when presented in a plurality of traffic segments, wherein each of the plurality of traffic segments comprises traffic related to a plurality of users; and
calculate an aggregated conversion rate of each given campaign of the plurality of campaigns when presented in the plurality of traffic segments, said calculate the aggregated conversion rate of each given campaign comprising:
obtain a first sum of observed conversions of the given campaign when presented in the plurality of traffic segments;
obtain a second sum of observed engagements of the given campaign when presented in the plurality of traffic segments; and
calculate the aggregated conversion rate of the given campaign based on the first sum and the second sum, wherein the aggregated conversion rate indicates a probability of a conversion to occur for an engagement with the given campaign when presented in any of the plurality of traffic segments; and
for a given traffic segment presenting one or more campaigns of the plurality of campaigns, calculate an estimated quality score of the given traffic segment, said calculate the estimated quality score of the given traffic segment comprising:
determine a third sum of observed conversions in the one or more campaigns when presented in the given traffic segment;
determine an expected sum of conversions of the one or more campaigns based on aggregated conversion rates of the one or more campaigns, as calculated in said calculating the aggregated conversion rate of each given campaign, and based on a number of observed engagements with each one of the one or more campaigns when presented in the given traffic segment; and
based on the third sum of observed conversions and the expected sum of conversions in the given traffic segment, calculate the estimated quality score of the given traffic segment, wherein the estimated quality score of the given traffic segment is indicative of a quality level of the observed engagements with the each one of the one or more campaigns when presented in the given traffic segment, wherein a quality level that is below a threshold indicates that the observed engagements comprise at least some intent-less engagements or fraudulent engagements in the given traffic segment.

13. The computerized device of claim 12, wherein said calculate the estimated quality score further comprises:
   assigning a respective weight to each campaign of the one or more campaigns;
   summing in the third sum a weighted value of the observed conversions determined in the one or more campaigns in the given traffic segment, according to the respective weight;
   summing a weighted value of the expected sum of conversions of the one or more campaigns according to the respective weight, to thereby obtain a segment-specific expected conversions value; and
   calculating the estimated quality score for the given traffic segment, based on a ratio between the third sum and the segment-specific expected conversions value.

14. The computerized device of claim 12, wherein the one or more processors are further configured to perform at least one of (i) and (ii):
   i. determine that an association exists between first and second campaigns of the plurality of campaigns; and
   calculate an aggregated conversion rate of the first campaign using data that includes observed conversions and observed engagements of the second campaign,
   ii. determine that an association exists between first and second traffic segments of the plurality of traffic segments; and
   calculate a segment-specific estimated quality score of the first traffic segment using data that includes observed conversions and expected conversions of the second traffic segment.

15. The computerized device of claim 12, wherein the one or more processors are further configured to:
   for a specific campaign from the one or more campaigns, calculate an adaptive estimated quality score of the specific campaign indicating an estimated quality score of the specific campaign when presented in the given traffic segment, said calculate the adaptive estimated quality score comprising:
      determining a fourth sum of observed engagements with the specific campaign when presented in the given traffic segment;
      determining a fifth sum of observed conversions in the specific campaign when presented in the given traffic segment;
      calculate a pair-specific quality score of the specific campaign based on a ratio between the fourth sum and the fifth sum;
      calculate the adaptive estimated quality score of the specific campaign based on a combination of a weighted value of the estimated quality score of the given traffic segment and a weighted value of the pair-specific quality score.

16. The computerized device of claim 12, wherein the one or more processors are further configured to generate an alert, in the event that the quality level is below the threshold.

17. The computerized device of claim 12, wherein the one or more processors are further configured to, upon determining that the observed engagements comprise the at least some intent-less engagements or fraudulent engagements, perform one or more of:
   generate an alert indicating a suspicion of an engagement fraud; and
   execute a preventive action directed for mitigating the engagement fraudd.

18. The computerized device of claim 12, wherein a reward is given per a user engagement with content of the one or more campaigns presented in the given traffic segment, the one or more processors are further configured to:
   automatically update a value of the reward according to changes detected in the estimated quality score of the given traffic segment.

19. The computerized device of claim 12, wherein the given traffic segment is associated to any one of: a website; a time frame; a group of users characterized by one or more common characteristics.

20. A non-transitory computer readable storage medium tangibly embodying a program of instructions that, when executed by a computer, cause the computer to perform a method
   for each given campaign of a plurality of campaigns, obtaining information pertaining to engagements and conversions of the given campaign when presented in a plurality of traffic segments, wherein each of the plurality of traffic segments comprises traffic related to a plurality of users; and
   calculating an aggregated conversion rate of each given campaign of the plurality of campaigns when presented in the plurality of traffic segments, said calculating the aggregated conversion rate of each given campaign comprising:
      obtaining a first sum of observed conversions of the given campaign when presented in the plurality of traffic segments;
      obtaining a second sum of observed engagements of the given campaign when presented in the first plurality of traffic segments; and
      calculating the aggregated conversion rate of the given campaign based on the first sum and the second sum, wherein the aggregated conversion rate indicates a probability of a conversion to occur for an engagement with the given campaign when presented in any of the plurality of traffic segments; and
   for a given traffic segment presenting one or more campaigns of the plurality of campaigns, calculating an estimated quality score of the given traffic segment, said calculating the estimated quality score of the given traffic segment comprising:
      determining a third sum of observed conversions in the one or more campaigns when presented in the given traffic segment;
      determining an expected sum of conversions of the one or more campaigns based on aggregated conversion rates of the one or more campaigns, as calculated in said calculating the aggregated conversion rate of each given campaign, and based on a number of observed engagements with each one of the one or more campaigns when presented in the given traffic segment; and
      based on the third sum of observed conversions and the expected sum of conversions in the given traffic segment, calculating the estimated quality score of the given traffic segment, wherein the estimated quality score of the given traffic segment is indicative of a quality level of the observed engagements with the each one of the one or more campaigns when presented in the given traffic segment, wherein a quality level that is below a threshold indicates that the observed engagements comprise at least some intent-less engagements or fraudulent engagements in the given traffic segment.

* * * * *